US012642721B2

(12) United States Patent
Heagerty

(10) Patent No.: US 12,642,721 B2
(45) Date of Patent: Jun. 2, 2026

(54) CHAIR WITH A LIFT MECHANISM

(71) Applicant: Michael Scot Heagerty, Bend, OR (US)

(72) Inventor: Michael Scot Heagerty, Bend, OR (US)

( * ) Notice: Subject to any disclaimer, the term of this patent is extended or adjusted under 35 U.S.C. 154(b) by 151 days.

(21) Appl. No.: 18/667,725

(22) Filed: May 17, 2024

(65) Prior Publication Data

US 2024/0382359 A1 Nov. 21, 2024

Related U.S. Application Data

(60) Provisional application No. 63/503,095, filed on May 18, 2023.

(51) Int. Cl.

| | |
|---|---|
| ***A61G 5/14*** | (2006.01) |
| ***A47C 1/034*** | (2006.01) |
| ***A47C 1/14*** | (2006.01) |

(52) U.S. Cl.

CPC .............. *A61G 5/14* (2013.01); *A47C 1/0342* (2013.01); *A47C 1/14* (2013.01)

(58) Field of Classification Search

CPC ................................ A61G 5/14; A47C 1/0342

See application file for complete search history.

(56) References Cited

U.S. PATENT DOCUMENTS 2,539,034 A * 1/1951 Ruby ..................... A61G 5/125 297/DIG. 10
4,778,217 A * 10/1988 Lane ........................ A61G 5/14 297/DIG. 10
4,809,804 A * 3/1989 Houston ................. B60L 1/003 297/DIG. 10
4,838,612 A 6/1989 Cross
4,884,841 A * 12/1989 Holley ................. A61G 7/1094 297/331
4,929,022 A * 5/1990 Geraci ..................... A61G 5/14 297/DIG. 10
4,979,726 A 12/1990 Geraci
5,011,224 A 4/1991 Paul
5,061,010 A * 10/1991 LaPointe .................. A61G 5/14 297/DIG. 10
6,213,554 B1 * 4/2001 Marcoux .................. A61G 5/14 297/DIG. 10

(Continued)

FOREIGN PATENT DOCUMENTS

WO WO-2011062646 A2 * 5/2011 ............... A61G 5/14

*Primary Examiner* — Joshua J Michener
*Assistant Examiner* — Nevena Aleksic

(57) ABSTRACT

A chair with a lift mechanism is a device that aids the user to safely get up from the chair without using motorized means to elevate the user's body. The device includes a seat platform and a base assembly. The seat platform is designed to accommodate the user's lower body when sitting on the device. The seat platform also moves with the user's body movements corresponding to the movements performed when getting up or sitting down on the device. The seat platform also provides the momentum necessary to help the user get up from the device using less effort. The base assembly provides support to the seat platform when the user is sitting on the device. The base assembly also enables the conversion of potential energy to kinetic energy using several components that aid the user in getting up from the device safely and comfortably.

19 Claims, 24 Drawing Sheets

(56) References Cited

U.S. PATENT DOCUMENTS

| | | | | |
|---|---|---|---|---|
| 8,398,171 | B2 * | 3/2013 | Lin | A61G 5/14 297/DIG. 10 |
| 8,636,317 | B2 | 1/2014 | Wu | |
| 9,050,231 | B2 * | 6/2015 | Masters | A61G 5/14 |
| 9,795,528 | B1 * | 10/2017 | Delmestri | A61G 5/104 |
| 2011/0289680 | A1 | 12/2011 | Sartisohn | |
| 2024/0307240 | A1 * | 9/2024 | Pereslete | A61G 5/006 |

* cited by examiner

CHAIR WITH A LIFT MECHANISM

FIELD OF THE INVENTION

The present invention relates generally to furniture and seating devices. More specifically, the present invention discloses a chair with an integrated mechanism that helps the user to get up from the chair comfortably and safely.

BACKGROUND OF THE INVENTION

Nowadays, many chairs have been designed with means to help the user to sit on the chair and/or to get up from the chair. These chairs are designed to help those who struggle to get up from the chair and are somewhat effective in doing so. However, the mechanisms of these chairs are slow and cumbersome since the mechanisms utilized often require an electric motor and power source which make the overall chair structure bulkier and heavier. Other non-motorized means have been made available to help people get up from a chair. For example, gas struts designed to help push portions of the chair upwards have been implemented by integrating hinged components in the seat portion of the chair. Another alternative involves implementing an inflatable bladder on the seat portion of the chair that can be selectively inflated by an electric pump to help the user get up from the chair. While these solutions help elevate the user's body from the chair, the user still needs to push themselves upward with their legs and feet which can result in compromising the user's balance while getting up. Such solutions fail to take into consideration the fluid motion of the coordinated user's body movements when getting up from the chair.

Therefore, an objective of the present invention is to provide a chair with a lift mechanism that implements quick and intuitive leveraging and weight balancing. The present invention implements a non-motorized lift mechanism that helps the user get up from the chair quickly and easily. Another objective of the present invention is to provide an integrated lift mechanism that allows the corresponding chair to be utilized in any location. The lift mechanism of the present invention can be operated without the need for a power source which allows the corresponding chair to be indoors or outdoors. Another objective of the present invention is to provide a chair structure that may include several support features that increase the comfort of the user without obstructing the operation of the integrated lift mechanism. The present invention can include an upright seat back that maintains a somewhat vertical position throughout the tilting motion of the chair as the user gets up from the chair or sits down on the chair. Additional features and benefits of the present invention are further discussed in the sections below.

SUMMARY OF THE INVENTION

The present invention discloses a chair with a lift mechanism that enables the user to use the multifaceted actions of their body to be tilted up and out of the chair while also using the energy conserved during the tilting down of the chair by the user's balanced body weight. The present invention allows the user to quickly and ergonomically self-generate the power and leverage needed for raising themselves from the chair when desired. To do so, the present invention includes a modular structure that implements several pivoting components that can move according to the user's body movements when getting up or sitting down on the chair of the present invention.

The main function of the present invention is to allow the user to sit down and get back up easily and intuitively without placing strains on the user's body while maintaining a mechanical function that does not rely on an outward source of energy such as electricity. In some embodiments, the present invention can include several mechanical and/or pneumatic devices that aid the movement of the different pivoting components of the present invention without requiring external power or torque generated by motorized components. Further, the chair of the present invention can include several support features, such as a chair back or a leg support, that support the user's body when the user is resting on the present invention.

DETAILED DESCRIPTIONS OF THE INVENTION

Figure 1:
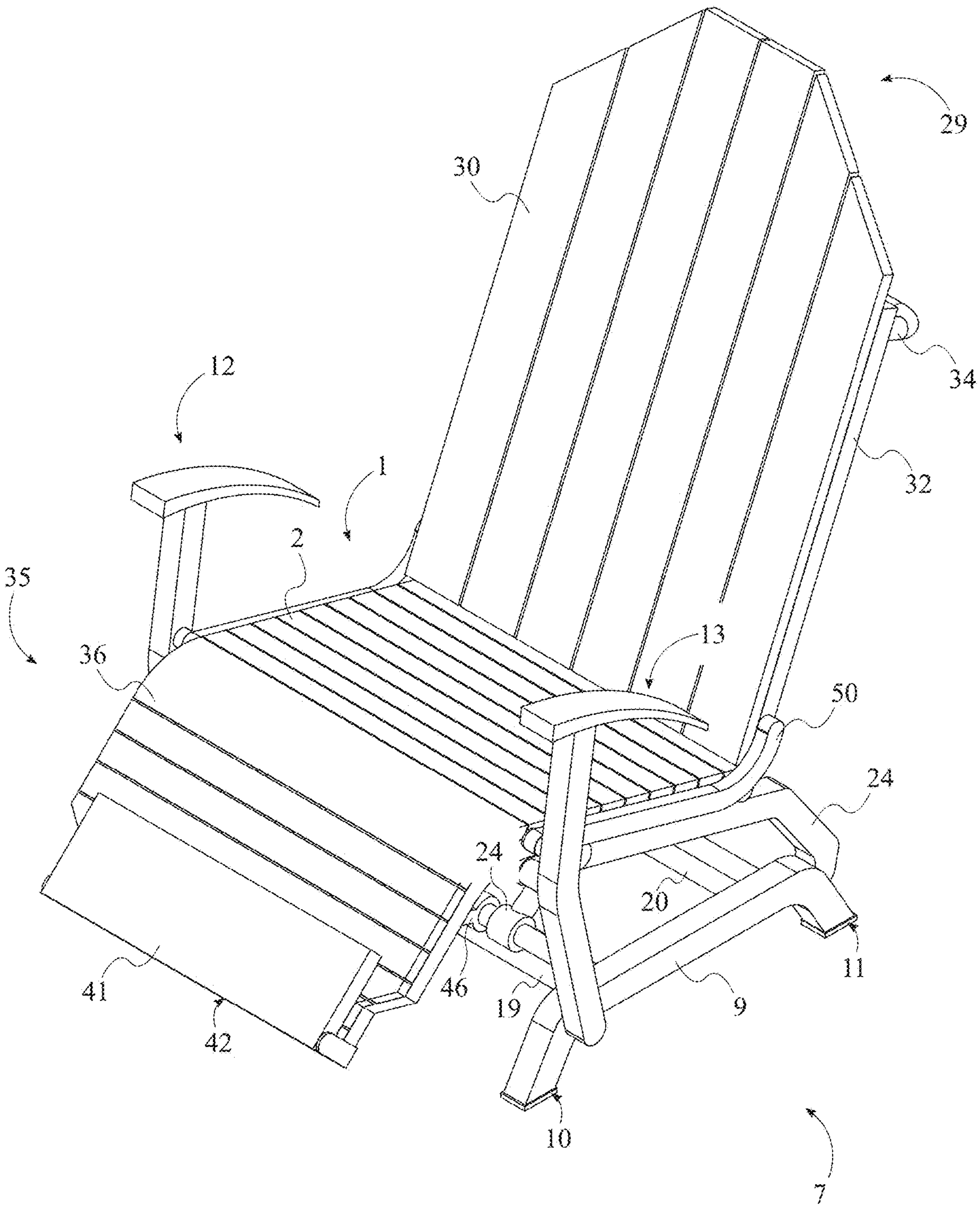
FIG. 1 is a top-front-left perspective view of the present invention.
Figure 2:
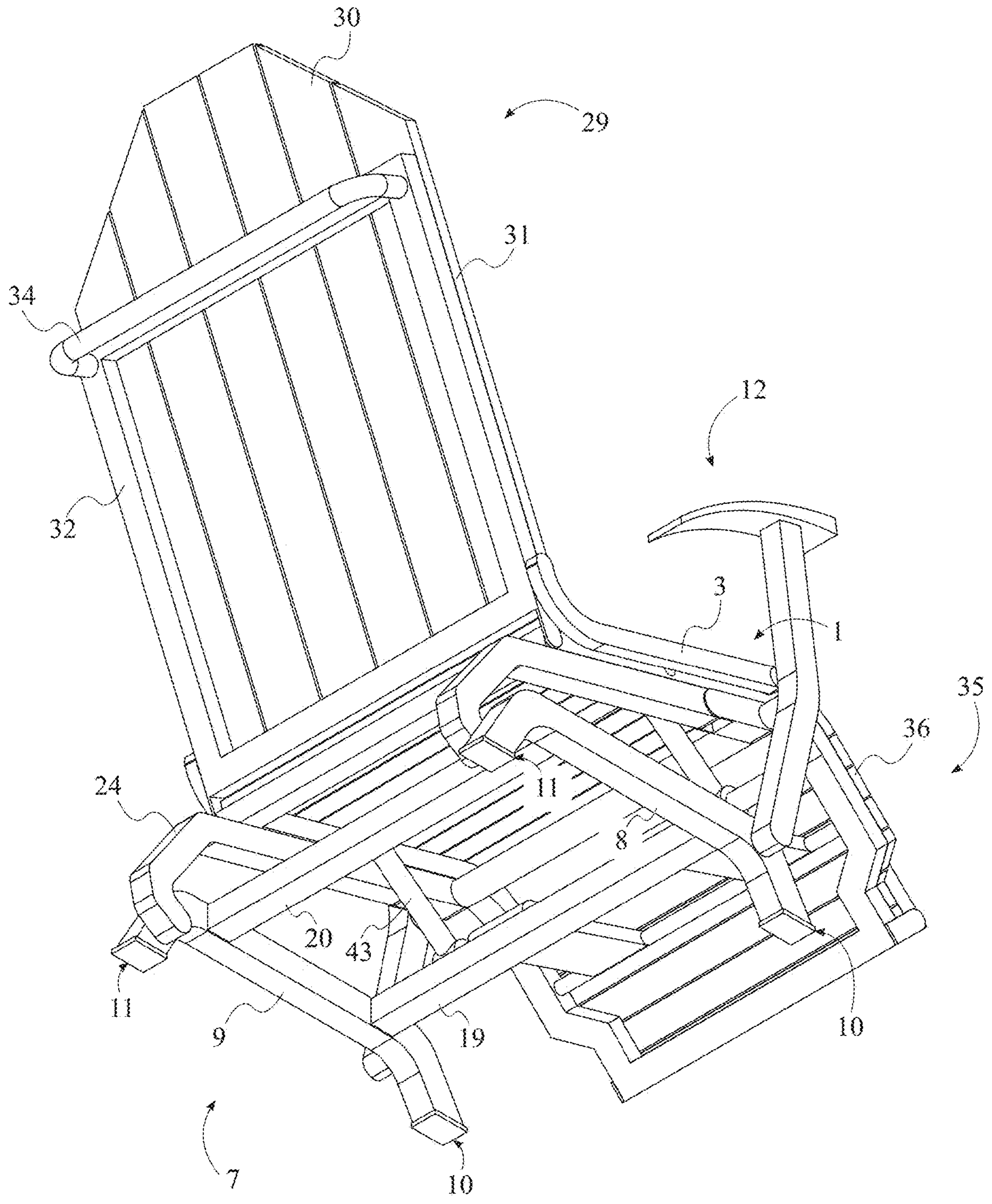
FIG. 2 is a bottom-rear-right perspective view thereof.
Figure 3:
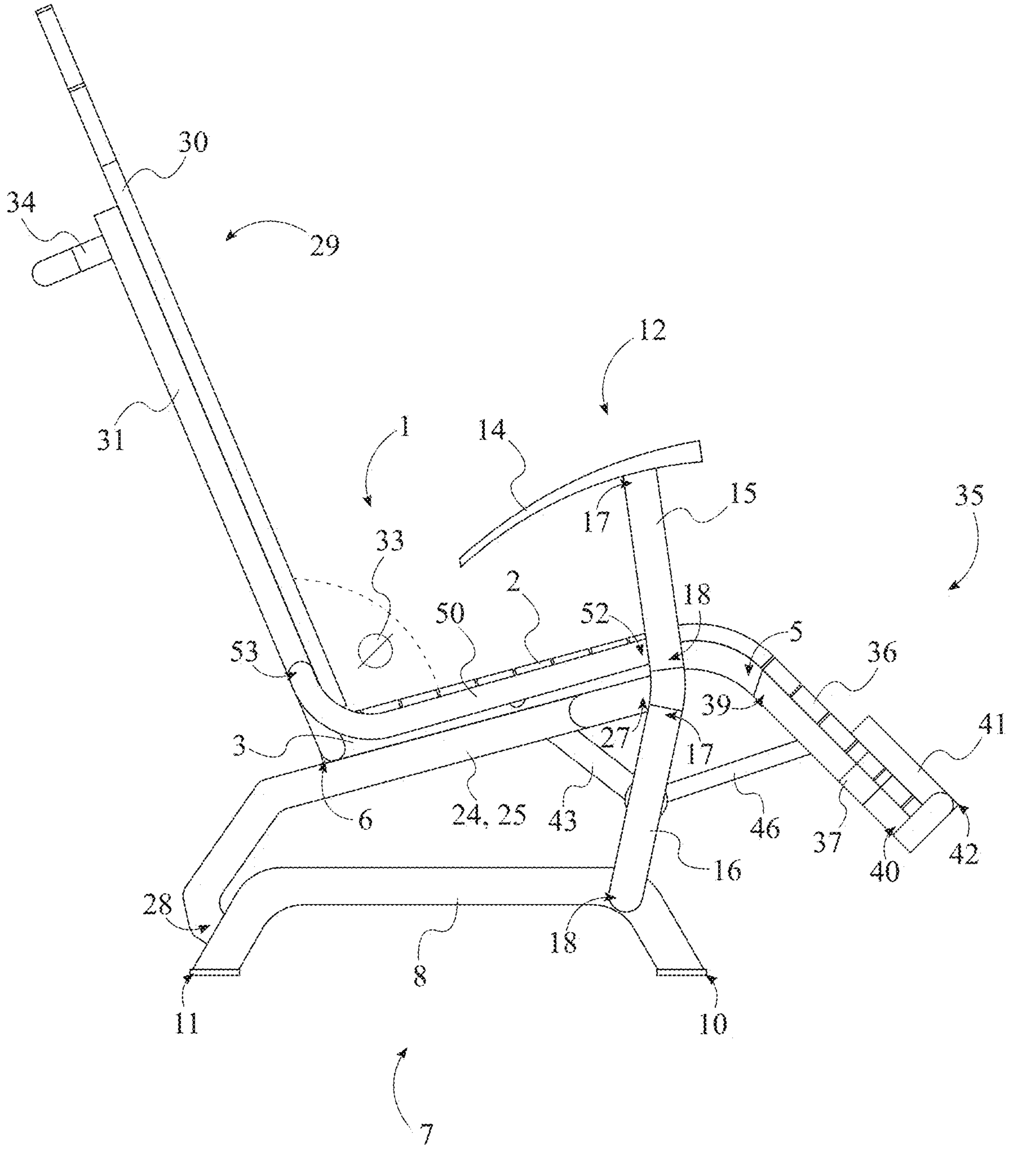
FIG. 3 is a right-side view thereof.
Figure 4:
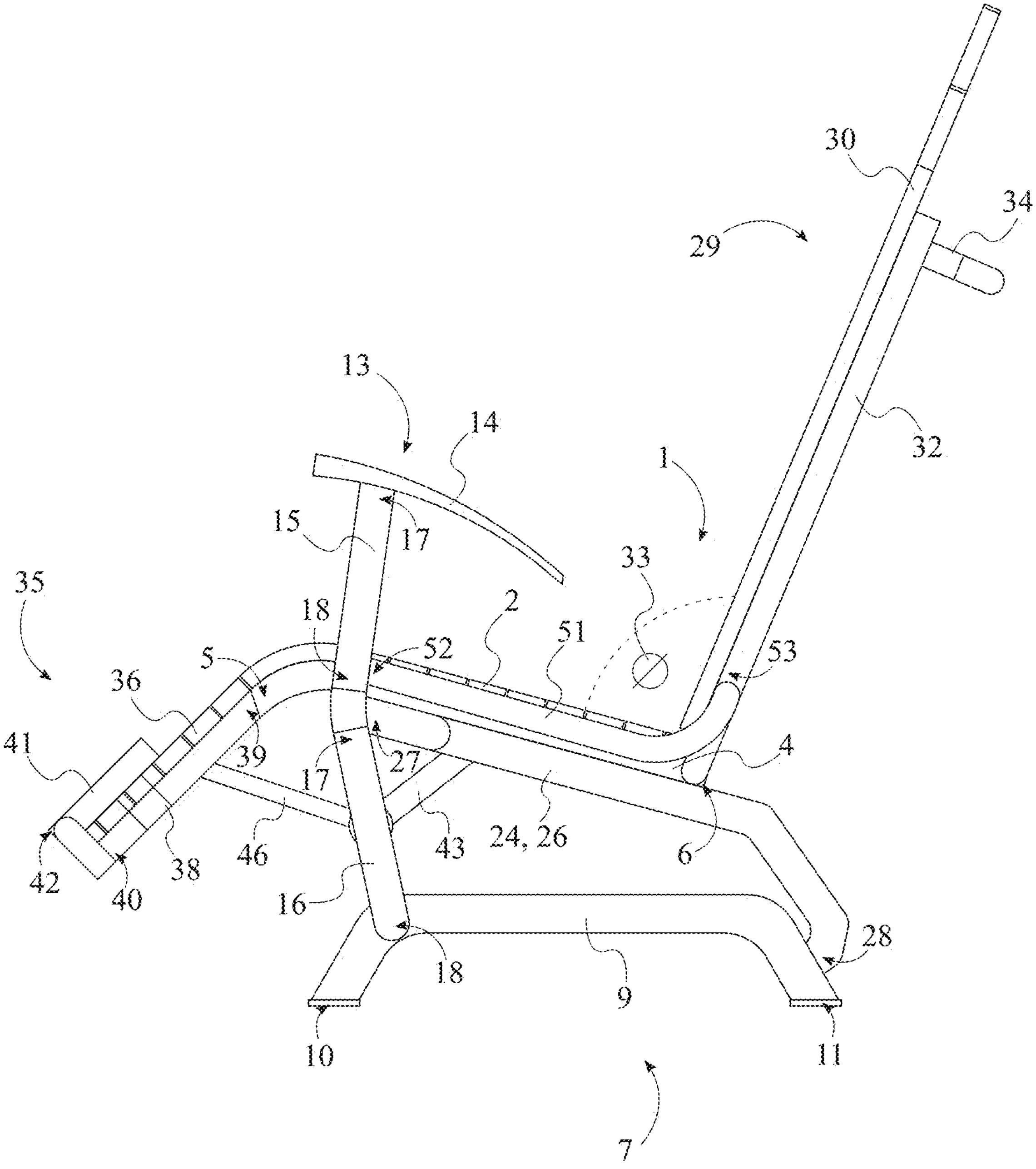
FIG. 4 is a left-side view thereof.
Figure 5:
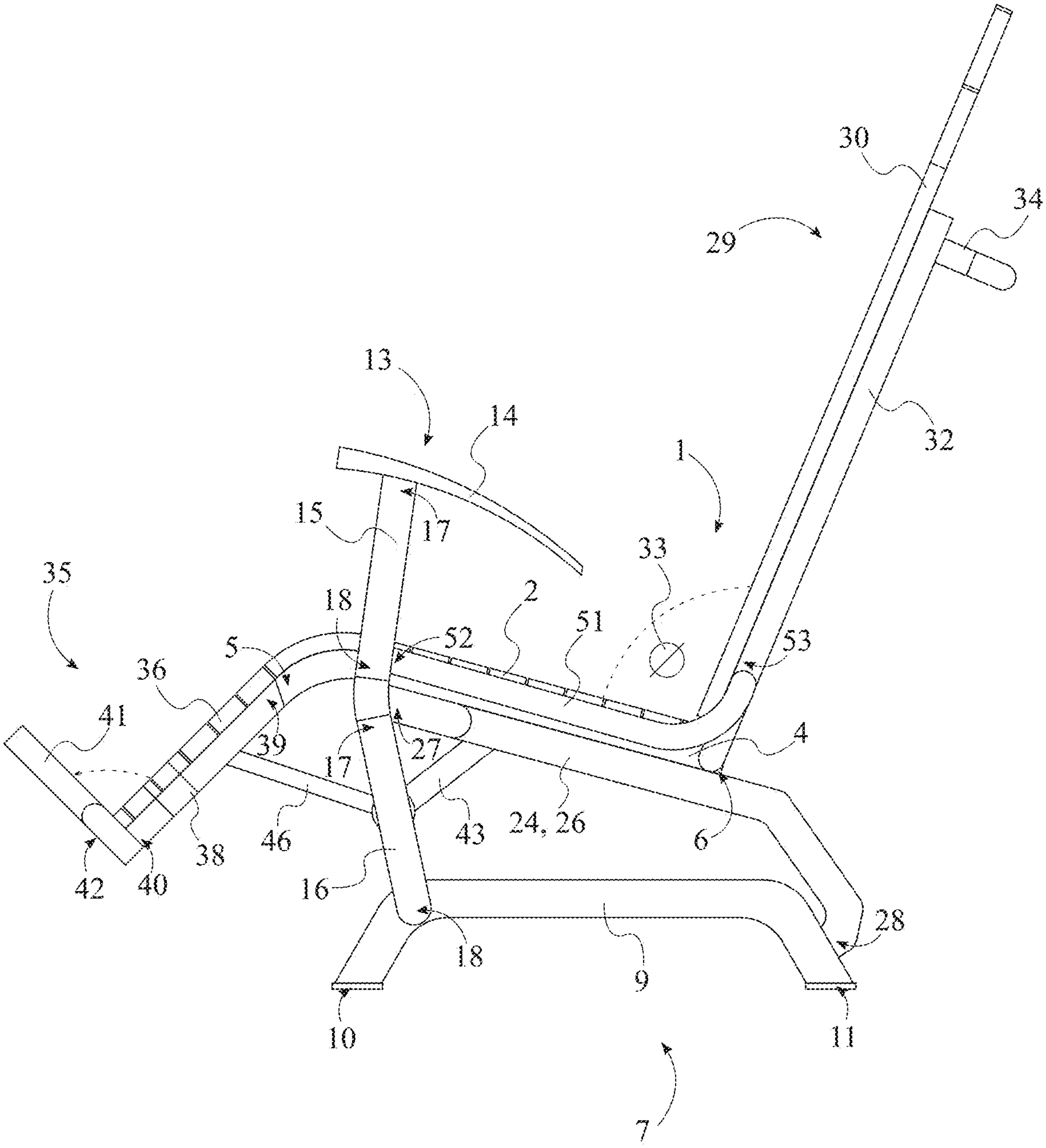
FIG. 5 is a left-side view thereof, wherein a foldable step of the present invention is shown deployed.
Figure 6:
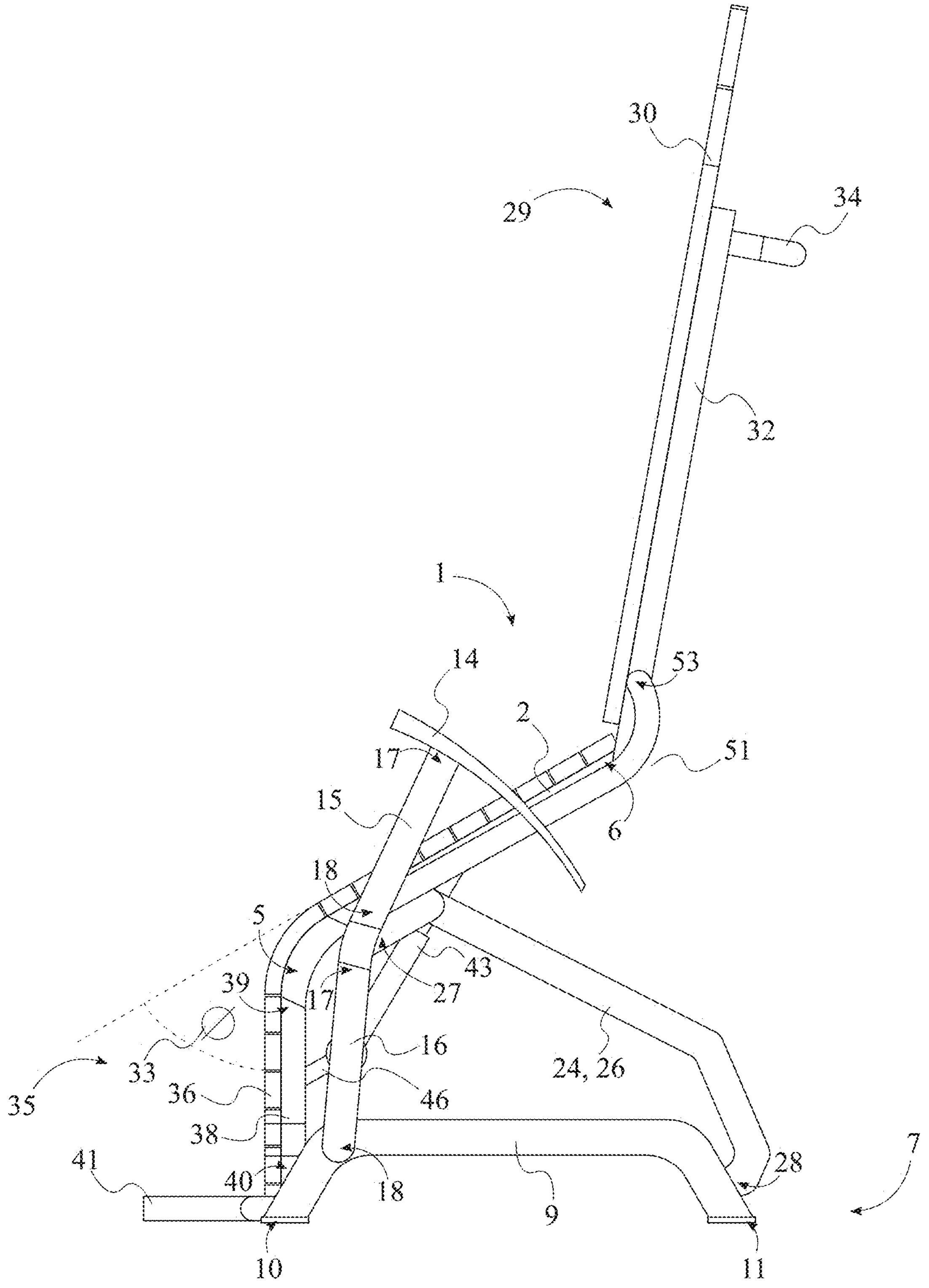
FIG. 6 is a left-side view thereof, wherein the seat platform of the present invention is shown pivoted forward to help the user get up.

All illustrations of the drawings are for the purpose of describing selected versions of the present invention and are not intended to limit the scope of the present invention.

The present invention discloses a chair with a lift mechanism that aids the user to safely get up from the chair without using motorized means to elevate the user's body. As can be seen in FIG. 1 through 13, the present invention comprises a seat platform 1 and a base assembly 7. The seat platform 1 is designed to accommodate the user's lower body when sitting on the present invention. The seat platform 1 also moves with the user's body movements corresponding to the movements performed when getting up or sitting down on the present invention. The base assembly 7 provides support to the seat platform 1 when the user is sitting on the present invention. The base assembly 7 also enables the conversion of potential energy to kinetic energy using various components that aid the user in getting up from the present invention safely and comfortably.

The general configuration of the present invention assists the user when getting up without utilizing motorized mechanisms or external power sources. As previously discussed, the base assembly 7 is designed to support the seat platform 1 to provide a safe and comfortable structure the user can sit on. As can be seen in FIG. 1 through 13, the base assembly 7 is designed as a modular structure arranged to elevate the seat platform 1 to a comfortable height for the user to sit on. In addition, the base assembly 7 accommodates the movement of the seat platform 1 when supporting the user getting up. The base assembly 7 comprises a right base support 8, a left base support 9, a right armrest 12, a left armrest 13, a front crossbar 19, a rear crossbar 20, a pivoting rod 21, and at least one support bar 24. The right base support 8, the left base support 9, the front crossbar 19, and the rear crossbar 20 correspond to the components that maintain the present invention upright on a surface. The right armrest 12 and the left armrest 13 support the user's arms while sitting on the present invention and provide control and stability to the user while getting up from the seat platform 1. The pivoting rod 21 connects the seat platform 1 to the base assembly 7 while enabling the seat platform 1 to move in a controlled motion on the base assembly 7. The at least one support bar 24 enables the conversion of potential energy to kinetic energy to aid the user getting up from the seat platform 1.

In a preferred embodiment, the present invention can be arranged as follows. As can be seen in FIG. 1 through 13, the right base support 8 and the left base support 9 are preferably two elongated structures long enough to stabilize the seat platform 1 on the base assembly 7. So, the right base support 8 and the left base support 9 each comprise a front end 10 and a rear end 11 corresponding to the terminal ends of each base support. The front crossbar 19 is connected between the right base support 8 and the left base support 9, adjacent to each front end 10, to secure the front end 10 of the right base support 8 to the front end 10 of the left base support 9. Similarly, the rear crossbar 20 is connected between the right base support 8 and the left base support 9, adjacent to each rear end 11, to secure the rear end 11 of the right base support 8 to the rear end 11 of the left base support 9. Further. the right armrest 12 is pivotally mounted onto the right base support 8, adjacent to the front end 10, to secure the right armrest 12 to the right base support 8. The pivotal connection of the right armrest 12 to the right base support 8 also allows the right armrest 12 to move in a controlled manner to help the user get up easily. Likewise, the left armrest 13 is pivotally mounted onto the left base support 9, adjacent to the front end 10, to secure the left armrest 13 to the left base support 9. The pivotal connection of the left armrest 13 to the left base support 9 also allows the left armrest 13 to move in a controlled manner to help the user get up easily.

As can be seen in FIG. 1 through 13, further, the pivoting rod 21 is terminally and pivotally connected to the right armrest 12, offset to the right base support 8, to secure the pivoting rod 21 to the right armrest 12. Similarly, the pivoting rod 21 is also terminally and pivotally connected to the left armrest 13, offset to the left base support 9, to secure the pivoting rod 21 to the left armrest 13. This way, the pivoting rod 21 can rotate freely while being supported at a height from the ground to support the pivotal movement of the seat platform 1. Further, the at least one support bar 24 is designed to control the movement of the right armrest 12 and the left armrest 13 so that the movement of the seat platform 1 is restricted to a predetermined path. So, the at least one support bar 24 is terminally and pivotally connected in between the right armrest 12 and the left armrest 13, adjacent to the pivoting rod 21. In addition, the at least one support bar 24 is also terminally and pivotally connected in between the rear end 11 of the right base support 8 and the rear end 11 of the left base support 9, adjacent to the rear crossbar 20. This way, the at least one support bar 24 can control the pivoting movement of the left armrest 13 and the right armrest 12 without obstructing the pivoting rod 21.

As can be seen in FIG. 1 through 13, in the preferred embodiment, the at least one support bar 24 is designed to control the pivoting motion of the right armrest 12 and the left armrest 13. For example, the at least one support bar 24 may include a curved end that is pivotally connected to the rear crossbar 20 to allow the at least one support bar 24 to pivot about the rear crossbar 20. The opposite end of the at least one support bar 24 may be pivotally connected to the right armrest 12 and the left armrest 13 by an extension bar that offsets the at least one support bar 24 from the pivoting rod 21. This way, the right armrest 12 and the left armrest 13 can pivot toward the rear crossbar 20 until the extension bar is positioned against the at least one support bar 24. On the other hand, the right armrest 12 and the left armrest 13 can pivot towards the front crossbar 19 until the extension bar and the at least one support bar 24 are fully extended. Furthermore, the seat platform 1 is laterally connected to the pivoting rod 21, opposite to the front crossbar 19, to secure the seat platform 1 to the pivoting rod 21. In other embodiments, the at least one support bar 24 can be designed differently to permit different ranges of movement for the right armrest 12 and the left armrest 13.

As can be seen in FIG. 1 through 13, in the preferred embodiment, as the right armrest 12 and the left armrest 13 pivot on the right base support 8 and the left base support 9, the seat platform 1 can pivot on the pivoting rod 21 as well. When the right armrest 12 and the left armrest 13 are pivoted forward, the seat platform 1 can pivot backward to allow the user to sit comfortably on the seat platform 1. When the user wants to get up, the user can push on the right armrest 12 and the left armrest 13 back to pivot the right armrest 12 and the left armrest 13 backward to move the user's body forward. As the user's body moves forward, the seat platform 1 pivots forward to help the user get up from the present invention. Simultaneously, the at least one support bar 24 pivots backward and upward to help pivot the seat platform 1 forward. This way, the user's natural movements when getting up are aided by the present invention to help maintain the user's balance while exerting less effort. In other embodiments, additional supporting means can be included in the present invention to further help the user get up from the seat platform 1 safely and easily.

As can be seen in FIG. 1 through 13, the at least one support bar 24 can be provided as a single unit that controls the movement of the seat platform 1, the first armrest, and the second armrest. However, several support bars can be implemented to provide greater structural strength to the present invention. In some embodiments, the at least one support bar 24 can be a right support bar 25 and a left support bar 26 that control the moving components of the present invention together on both sides of the base assembly 7. Further, due to the elongated design of the pivoting rod 21, the pivoting rod 21 may comprise a right rod end 22 and a left rod end 23 corresponding to the terminal ends of the pivoting rod 21. Similarly, due to the elongated design of the support bars, the right support bar 25 and the left support bar 26 each comprise a front support end 27 and a rear support end 28 corresponding to the terminal ends of each support bar. The present invention can be arranged as follows. The front crossbar 19, the rear crossbar 20, and the pivoting rod 21 are positioned parallel to each other to keep the pivoting of the right armrest 12 parallel to the left armrest 13. In addition, the right rod end 22 and the front support end 27 of the right support bar 25 are pivotally connected to the right armrest 12. For example, the right rod end 22 and the front support end 27 of the right support bar 25 can be fastened to the right armrest 12 using the same pivoting fastener (e.g., screw, screw and washer, pin, etc.). Likewise, the left rod end 23 and the front support end 27 of the left support bar 26 are pivotally connected to the left armrest 13. For example, the left rod end 23 and the front support end 27 of the left support bar 26 can also be fastened to the left armrest 13 using the same pivoting fastener (e.g., screw, screw and washer, pin, etc.). Further, the rear support end 28 of the right support bar 25 is pivotally connected to the rear end 11 of the right base support 8, adjacent to the rear crossbar 20, to form a pivotal connection with the right base support 8. Likewise, the rear support end 28 of the left support bar 26 is pivotally connected to the rear end 11 of the left base support 9, adjacent to the rear crossbar 20, to form a pivotal connection with the left base support 9. This way, the right support bar 25 and the left support bar 26 can move synchronously to keep the seat platform 1 stable while moving on the support assembly.

In the preferred embodiment, the seat platform 1 is designed to support the user's buttocks comfortably when the user is sitting on the present invention and when the user is getting up. As can be seen in FIG. 1 through 13, the seat platform 1 may comprise a seat body 2, a right seat bar 3, and a left seat bar 4. The seat body 2 corresponds to the sitting area of the seat platform 1. The seat body 2 is preferably a rectangular body with a curvature that conforms to the user's buttocks. In addition, the seat body 2 can be a singular piece of material or several pieces of material joined together to form a single structure. However, other shapes and designs can be implemented for the seat body 2. The right seat bar 3 and the left seat bar 4 allow the attachment of the seat body 2 to the base assembly 7 and other components. The right seat bar 3 and the left seat bar 4 are preferably two elongated bars that frame the seat body 2. So, the right seat bar 3 and the left seat bar 4 each comprise a front bar end 5 and a rear bar end 6 corresponding to the terminal ends of each seat bar. In addition, the right seat bar 3 and the left seat bar 4 are positioned parallel and offset to each other due to the overall rectangular design of the seat body 2. Further, each front bar end 5 is positioned adjacent to the pivoting rod 21, while each rear bar end 6 being positioned offset to the pivoting rod 21. This positioning of the right seat bar 3 and the left seat bar 4 offsets the seat body 2 from the pivoting rod 21 to promote the pivoting motion of the seat platform 1. Further, the right seat bar 3 is laterally connected to the pivoting rod 21, adjacent to the right armrest 12, to secure the right seat bar 3 to the pivoting rod 21. Likewise, the left seat bar 4 is laterally connected to the pivoting rod 21, adjacent to the left armrest 13, to secure the left seat bar 4 to the pivoting rod 21. Furthermore, the right seat bar 3 is laterally attached to the seat body 2 to secure the right seat bar 3 to the seat body 2. Likewise, the left seat bar 4 is also laterally attached to the seat body 2, opposite to the right seat bar 3, to secure the left seat bar 4 to the seat body 2. This way, the seat body 2 is attached to the pivoting rod 21 so that the seat body 2 can pivot.

In some embodiments, the present invention can include back support for the user so that the user can fully lay on the present invention when sitting down. As can be seen in FIG. 1 through 6, the present invention may further comprise a chair back 29 that supports the user's back when the user sits on the seat platform 1. Like the seat platform 1, the chair back 29 can be a modular framed structure. So, the chair back 29 comprises a back body 30, a right back bar 31, a left back bar 32, a right back arm 50, and a left back arm 21. The back body 30 corresponds to the structure the user's back is placed against. Like the seat body 2, the back body 30 can be a single piece of material or various pieces of material arranged to form a single structure. In addition, the back body 30 can have a shape and size that matches the shape and size of the seat body 2. The right back bar 31 and the left back bar 32 frame the back body 30 so that the back body 30 can be attached to the present invention. The right back arm 50 and a left back arm 21 enable the connection of the chair back 29 to the seat platform 1 in a hinged manner to enable the chair back 29 to move with the seat platform 1 when the user gets up.

As can be seen in FIG. 1 through 6, the chair back 29 can be arranged as follows. The back body 30 is oriented at an angle 33 with the seat body 2 so that the user's back comfortably rests on the chair back 29 when the user sits on the seat platform 1. For example, when the user is sitting on the seat platform 1, the seating angle 33 between the back body 30 is the seat body 2 can be equal to or greater than 90 degrees. Further, the right back bar 31 is laterally attached to the back body 30 to secure the right back bar 31 to the back body 30. Likewise, the left back bar 32 is laterally attached to the back body 30, opposite to the right back bar 31, to secure the left back bar 32 to the back body 30. Furthermore, the rear bar end 6 of the right seat bar 3 is hingedly connected to the right back bar 31 to secure the right back bar 31 to the right seat bar 3. Similarly, the rear bar end 6 of the left seat bar 4 is hingedly connected to the left back bar 32 to secure the left back bar 32 to the left seat bar 4. Further, the front arm end 52 of the right back arm 50 is pivotally connected to right armrest 12, adjacent to the pivoting rod 21, to connect the right back arm 50 to the right armrest 12. In addition, the rear arm end 53 of the right back arm 50 is laterally and pivotally connected to the right back bar 31, offset to the rear bar end 6 of the right seat bar 3 to connect the right back arm 50 to the right back bar 31. Similarly, the front arm end 52 of the left back arm 51 is pivotally connected to left armrest 13, adjacent to the pivoting rod 21, to connect the left back arm 51 to the left armrest 13. In addition, the rear arm end 53 of the left back arm 51 is laterally and pivotally connected to the left back bar 32, offset to the rear bar end 6 of the left seat bar 4 to connect the left back arm 51 to the left back bar 32. This way, the chair back 29 moves with the seat platform 1 as the user sits down or gets up. The pivot connection between the chair back 29 and the seat platform 1 also allows the chair back 29 to pivot away from the seat platform 1. When the user gets up, the back body 30 pivots away from the seat body 2 at an expanded angle 33 greater than the seating angle 33 to clear space for the user's body.

Figure 7:
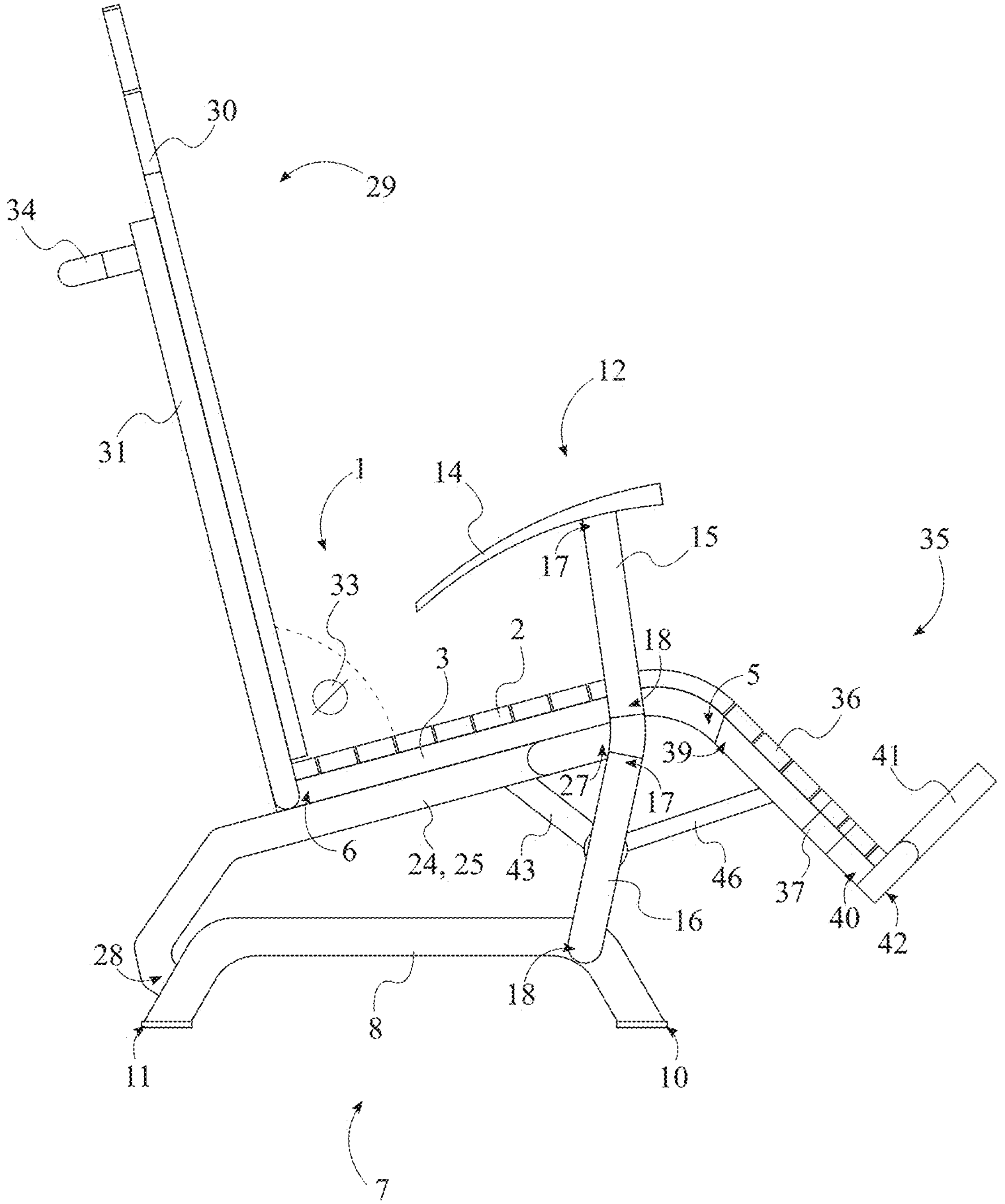
FIG. 7 is a right-side view thereof, wherein the chair back of the present invention is shown connected to the seat platform in a fixed orientation.
Figure 8:
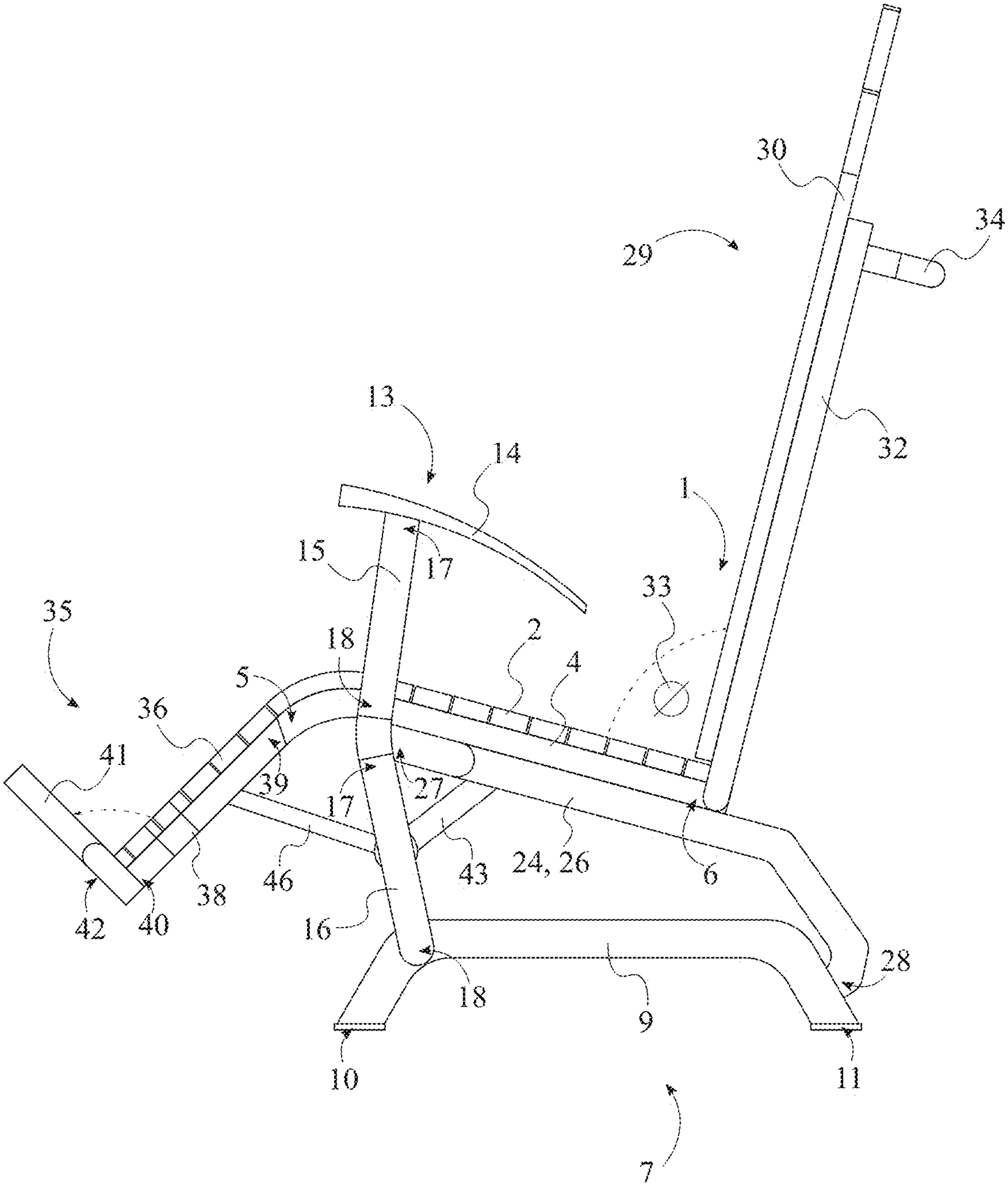
FIG. 8 is a left-side view thereof.
Figure 9:
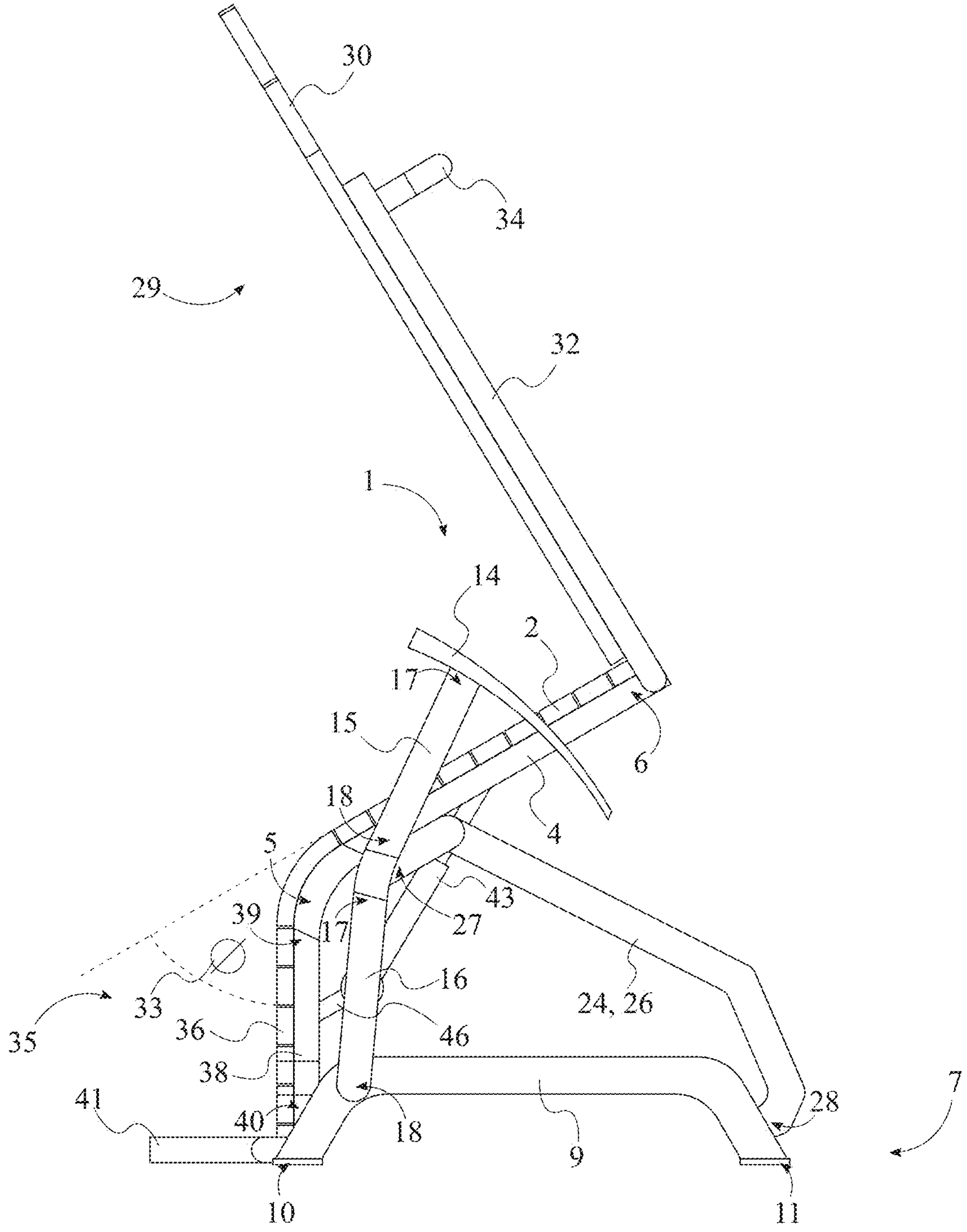
FIG. 9 is a left-side view thereof, wherein the seat platform of the present invention is shown pivoted forward to help the user get up.

As can be seen in FIG. 7 through 9, in another embodiment, the chair back 29 can be connected to the seat platform 1 in a fixed orientation. In other words, as the seat platform 1 pivots on the pivoting rod 21, the chair back 29 remains at a fixed orientation relative to the seat platform 1. To do so, the rear bar end 6 of the right seat bar 3 is laterally connected to the right back bar 31, and the rear bar end 6 of the left seat bar 4 is also laterally connected to the left back bar 32. This way, the chair back 29 moves with the seat platform 1 as the user sits down or gets up and maintains a constant orientation with the seat body 2. In other embodiments, the seat back can be arranged with the seat platform 1 in different configurations according to the overall design of the present invention.

In some embodiments, the present invention can provide a means for other users to help the sitting user get up using the present invention. As can be seen in FIG. 1 through 9, the present invention may further comprise at least one back handle 34 which enables another user to operate the present invention from a standing position. The at least one back handle 34 also facilitates the transportation of the present invention by providing the user with a comfortable location to grab onto. So, the at least one back handle 34 is laterally connected to the back body 30, opposite to the seat platform 1 across, to secure the at least one back handle 34 to the chair back 29. This way, the user can help move the seat platform 1 by applying pressure onto the chair back 29 using the at least one back handle 34. In other embodiments, different support features can be provided on the seat platform 1 and/or the chair back 29.

Figure 19:
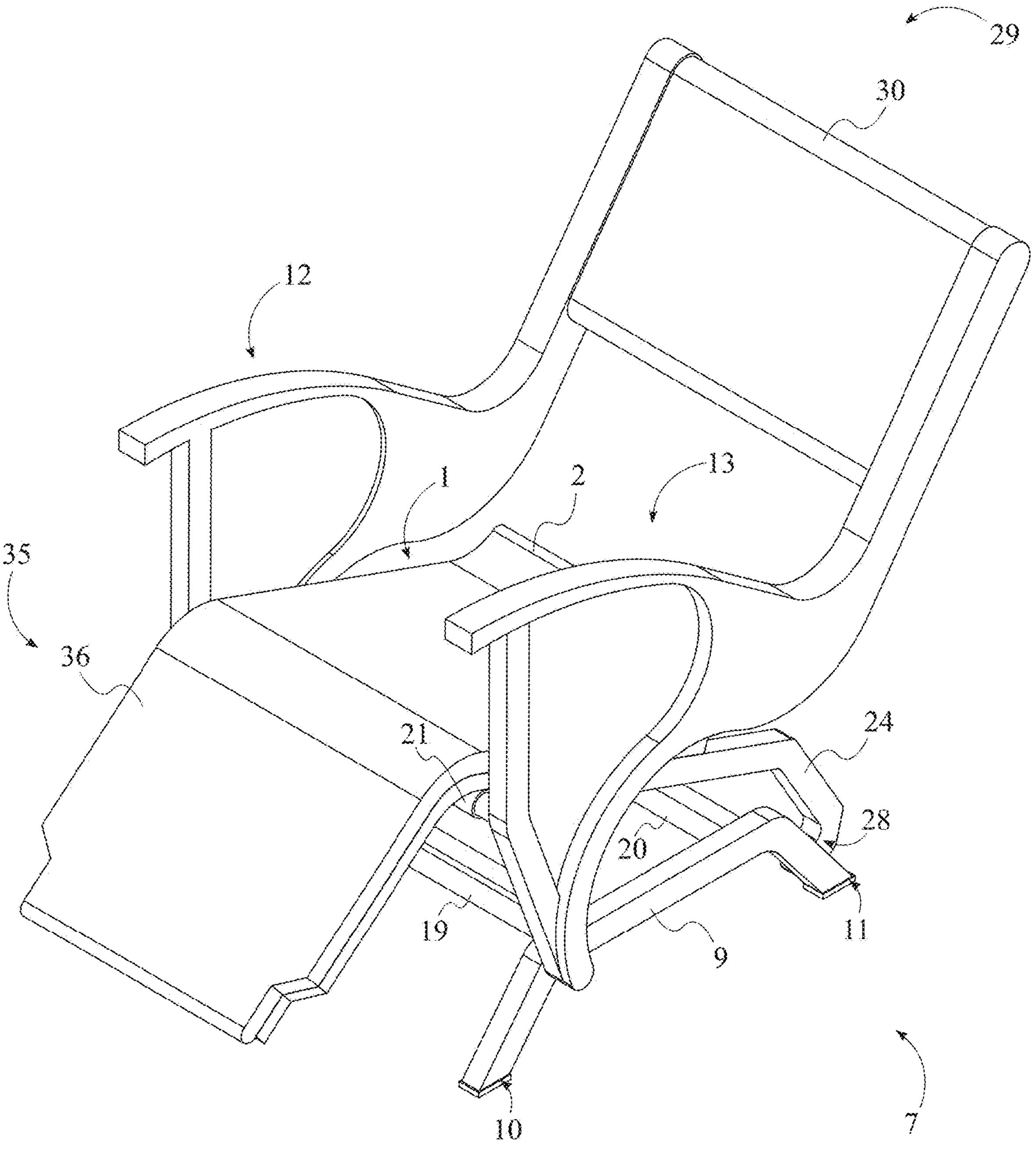
FIG. 19 is a top-front-left perspective view of an alternate embodiment of the present invention, wherein the chair back of the present invention is shown connected to the right armrest and the left armrest of the base assembly.
Figure 20:
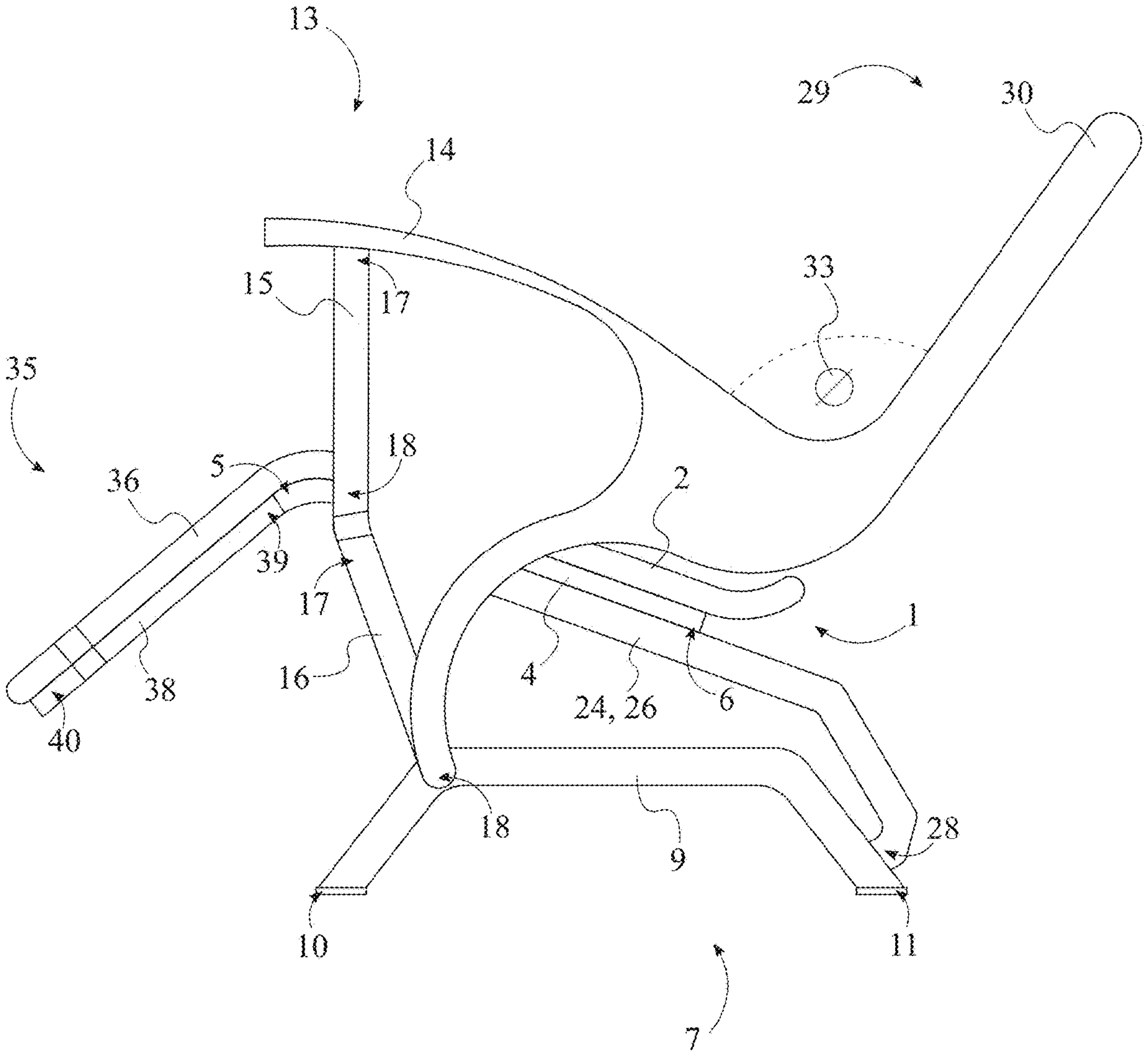
FIG. 20 is a left-side view thereof.
Figure 21:
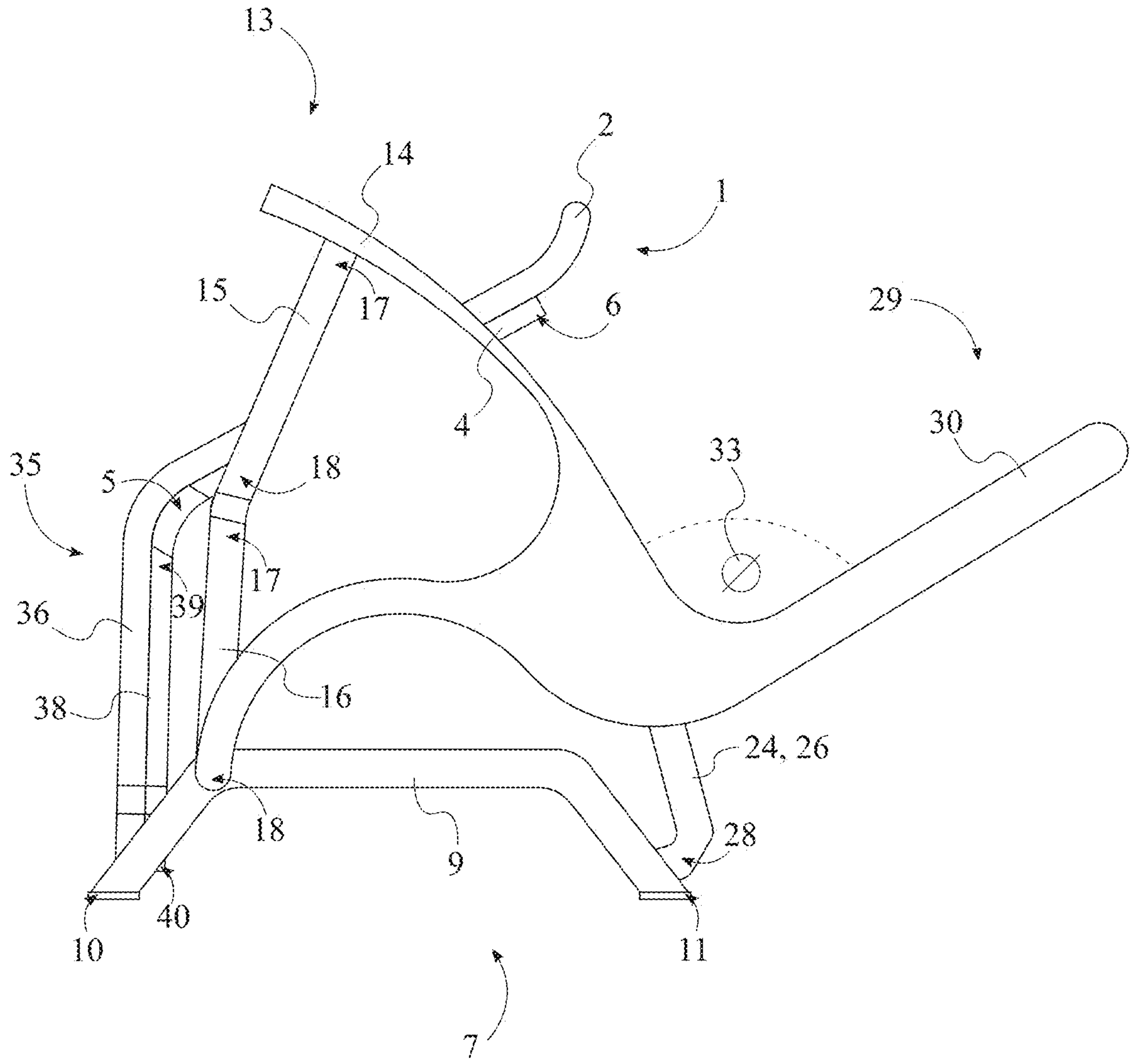
FIG. 21 is a left-side view thereof, wherein the seat platform of the alternate embodiment of the present invention is shown pivoted forward to help the user get up.

As previously discussed, the chair back 29 can be arranged differently to move separately from the seat platform 1. For example, the chair back 29 can be directly connected to the right armrest 12 and the left armrest 13. As can be seen in FIG. 19 through 21, in this embodiment, the chair back 29 is oriented at an angle 33 with the right armrest 12 and the left armrest 13. Like before, the angle 33 between the chair back 29 and the armrests corresponds to an angle 33 greater than 90 degrees that allows the user to comfortably sit on the seat platform 1 and rest on the chair back 29. Further, the chair back 29 is positioned offset to the front crossbar 19, preferably adjacent to the rear of the seat platform 1, to receive the user's back when the user sits on the seat platform 1. In addition, the chair back 29 is laterally connected to the right armrest 12 to secure the chair back 29 to the right armrest 12. Similarly, the chair back 29 is laterally connected to the left armrest 13, opposite to the right armrest 12, to secure the chair back 29 to the left armrest 13. This way, as the chair platform pivots on the base assembly 7, while the user gets up or sits down, the chair back 29 remains in a fixed orientation with the armrests without interfering with the movement of the pivoting components.

When getting up, the user moves the body to generate forward momentum that can be used to translate from a sitting position to a standing position. This movement is facilitated by the present invention so that the user exerts less force to get up. As can be seen in FIG. 1 through 9, to further aid the user, the seat platform 1 may further comprise a leg support 35 that can be used as leverage to pivot the seat platform 1 in the desired direction. The leg support 35 also serves to prop the user's legs up when the user is sitting on the present invention. Like the seat platform 1, the leg support 35 is also a modular structure designed to match the structure of the seat platform 1 and the base assembly 7. So, the leg support 35 comprises a leg body 36, a right leg bar 37, and a left leg bar 38. The leg body 36 corresponds to the structure that interfaces the user's legs. Like the seat body 2, the leg body 36 can be a structure made from a single piece of material or several pieces of material arranged into a single structure. The leg body 36 preferably has a shape and size matching the shape and size of the seat body 2. The right leg bar 37 and the left leg bar 38 frame the leg body 36 to help connect the leg support 35 to the seat platform 1. The right leg bar 37 and the left leg bar 38 are preferably two elongated structures that match the size of the leg body 36. So, the right leg bar 37 and the left leg bar 38 each comprise a proximal bar end 39 and a distal bar end 40 corresponding to the terminal ends of each leg bar.

As can be seen in FIG. 1 through 9, the leg support 35 can be arranged as follows. The right leg bar 37 and the left leg bar 38 are positioned parallel and offset to each other to surround the leg body 36. The right leg bar 37 is positioned at an angle 33 with the right seat bar 3. Similarly, the left leg bar 38 is positioned at an angle 33 with the left seat bar 4 to match the orientation of the right leg bar 37. The angle 33 of orientation is preferably an angle 33 where the user's legs are elevated off the ground when the user is sitting on the seat platform 1. Further, the proximal bar end 39 of the right leg bar 37 is connected to the front bar end 5 of the right seat bar 3 to connect the right leg bar 37 to the right seat bar 3. Likewise, the proximal bar end 39 of the left leg bar 38 is connected to the front bar end 5 of the left seat bar 4 to connect the left leg bar 38 to the left seat bar 4. Finally, the leg body 36 is mounted onto the right leg bar 37 and the left leg bar 38, opposite to the base assembly 7 to complete the leg support 35 assembly. In some embodiments, the leg body 36 can be a continuous portion of the seat body 2. In other embodiments, different supports can be implemented for the user's legs that can also be utilized as leverage.

As can be seen in FIG. 1 through 9, to provide additional support to the user's feet when the legs are positioned on the leg support 35, the seat platform 1 may further comprise a foldable step 41. The foldable step 41 is a smaller structure designed to receive the user's feet when the user is sitting on the seat platform 1. The foldable step 41 is preferably designed to complement the seat platform 1 design as well as the leg support designed. Further, the foldable step 41 comprises a fixed step edge 42 corresponding to the edge connected to the leg support 35. So, the fixed step edge 42 is hingedly connected between the distal bar end 40 of the right leg bar 37 and the distal bar end 40 of the left leg bar 38. This way, the foldable step 41 can be selectively deployed whenever the user wants to have more support on the legs. In other embodiments, different support devices can be implemented into the seat platform 1 that can be stored away when not desired.

As previously discussed, the right armrest 12 and the left armrest 13 can each be designed as single structures that support the seat platform 1 and all moving components. However, in some embodiments, the right armrest 12 and the left armrest 13 can be designed as modular structures that accommodate the pivoting movements of the various components. As can be seen in FIG. 1 through 13, in the modular embodiment of the armrests, the right armrest 12 and the left armrest 13 may each comprise an armrest handle 14, a first arm bar 15, and a second arm bar 16. The armrest handle 14 corresponds to the portion of each armrest that supports the corresponding user's arm. The first arm bar 15 and the second arm bar 16 correspond to the components that connect the armrest handle 14 to the corresponding base support while also facilitating the pivoting movements of the various moving components. The first arm bar 15 and the second arm bar 16 are preferably two elongated structures with sizes that elevate the seat platform 1 at the desired height from the ground. Further, the first arm bar 15 and the second arm bar 16 each comprise a first bar end 17 and a second bar end 18 corresponding to the terminal ends of each arm bar.

As can be seen in FIG. 1 through 13, the modular embodiment of the right armrest 12 and the left armrest 13 can be arranged as follows. The armrest handle 14 of the right armrest 12 and the armrest handle 14 of the left armrest 13 are positioned parallel to each other to provide stable support to the user's arms. The first bar end 17 of each first arm bar 15 is terminally connected to the corresponding armrest handle 14. In other words, the first arm bar 15 of each armrest is terminally connected to the corresponding armrest handle 14, preferably in an orthogonal orientation. However, different arrangements can be implemented for the first arm bar 15 and the corresponding armrest. Further, the second bar end 18 of each first arm bar 15 is terminally connected to the first bar end 17 of the corresponding second arm bar 16 to secure the first arm bar 15 to the corresponding second arm bar 16. In addition, the pivoting rod 21 is terminally and pivotally connected to the first bar end 17 of the second arm bar 16 of the right armrest 12 to secure the pivoting rod to the right armrest 12. Likewise, the pivoting rod 21 is also terminally and pivotally connected to the first bar end 17 of the second arm bar 16 of the left armrest 13 to secure the pivoting rod to the left armrest 13. Further, the second bar end 18 of the second arm bar 16 of the right armrest 12 is pivotally connected to the right base support 8 to secure the second arm bar 16 to the right base support 8. Similarly, the second bar end 18 of the second arm bar 16 of the left armrest 13 is pivotally connected to the left base support 9 to secure the second arm bar 16 to the left base support 9. This way, each armrest can pivot on the corresponding base support by the second arm bar 16. When the user sits on the seat platform 1, the second arm bar 16 pivots forward to fully extend the at least one support bar 24. This allows the seat platform 1 to rest on the least one support bar, which positions the first arm bar 15 and the armrest handle 14 in an overall upright orientation. On the other hand, when the user wants to get up, the user pushes on the leg support 35 which pivots the first arm bar 15 backward to push the at least one support bar 24 backward and upward. This also moves the seat platform 1 upward to help the user get up with less effort.

Figure 13:
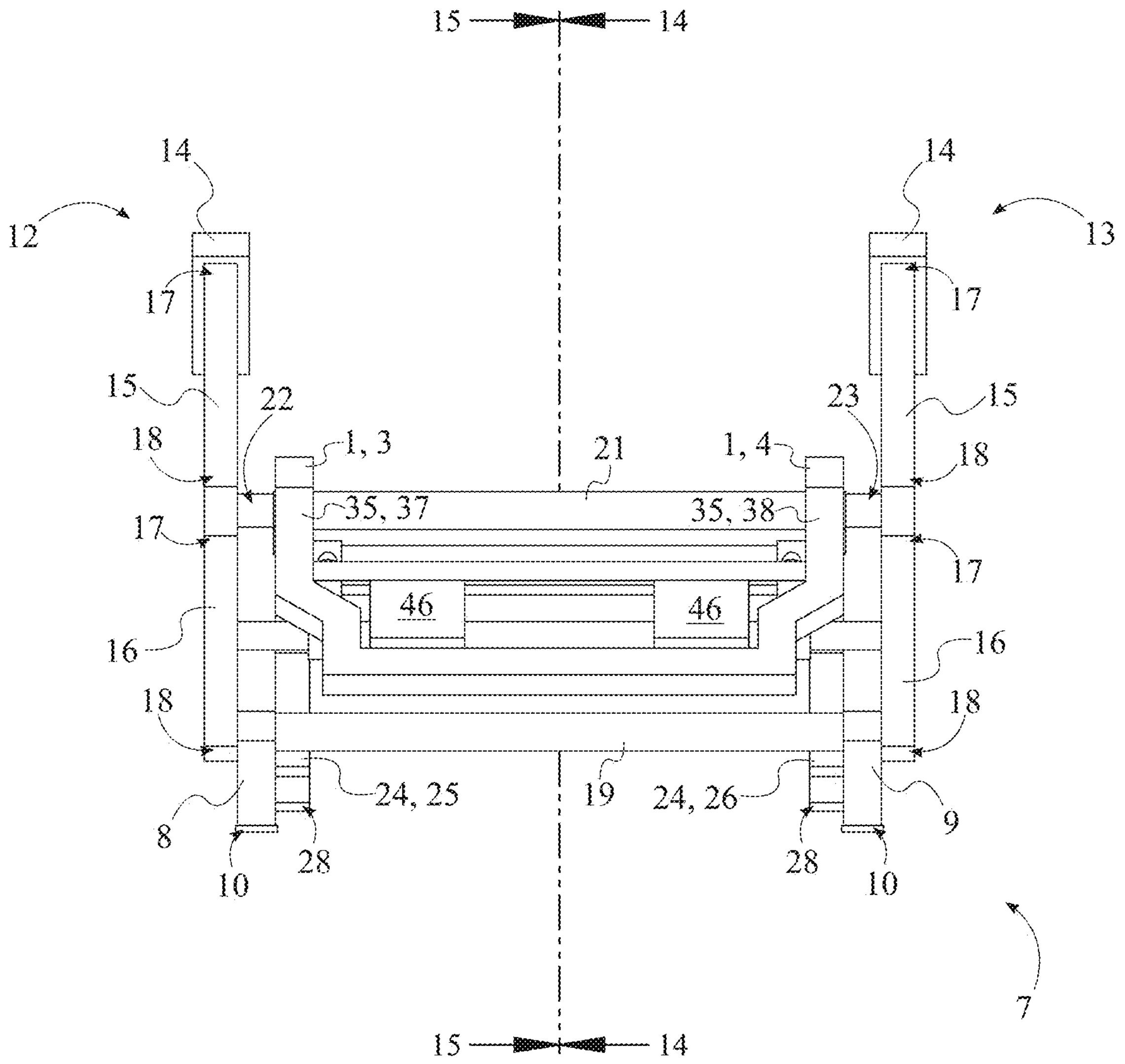
FIG. 13 is a front-side view of a second embodiment of the base assembly of the present invention, wherein present invention is shown without a seat body, a leg body, nor a chair back.
Figure 14:
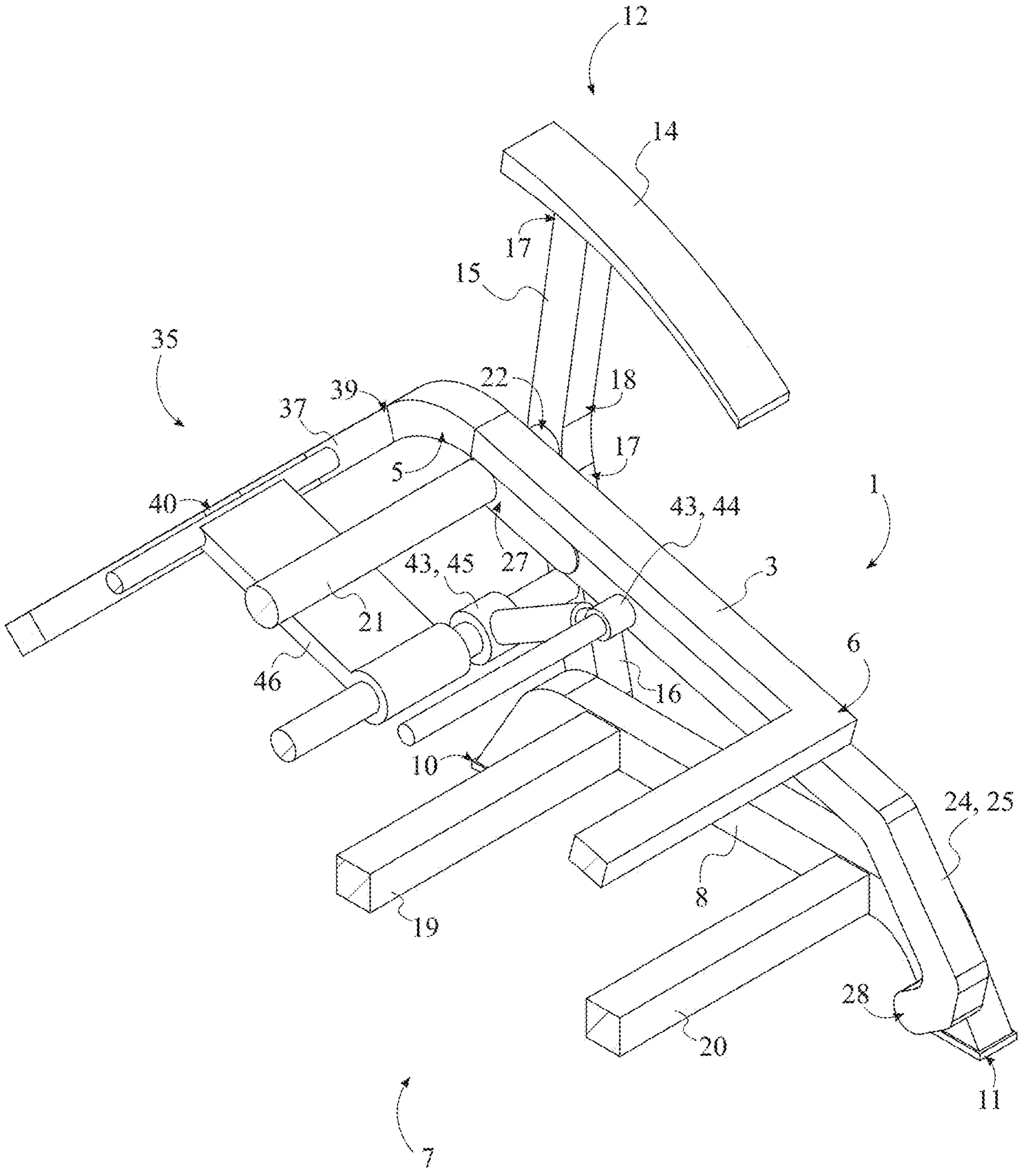
FIG. 14 is an enlarged vertical cross-sectional perspective view of the present invention taken along line 14-14 in FIG. 13.
Figure 15:
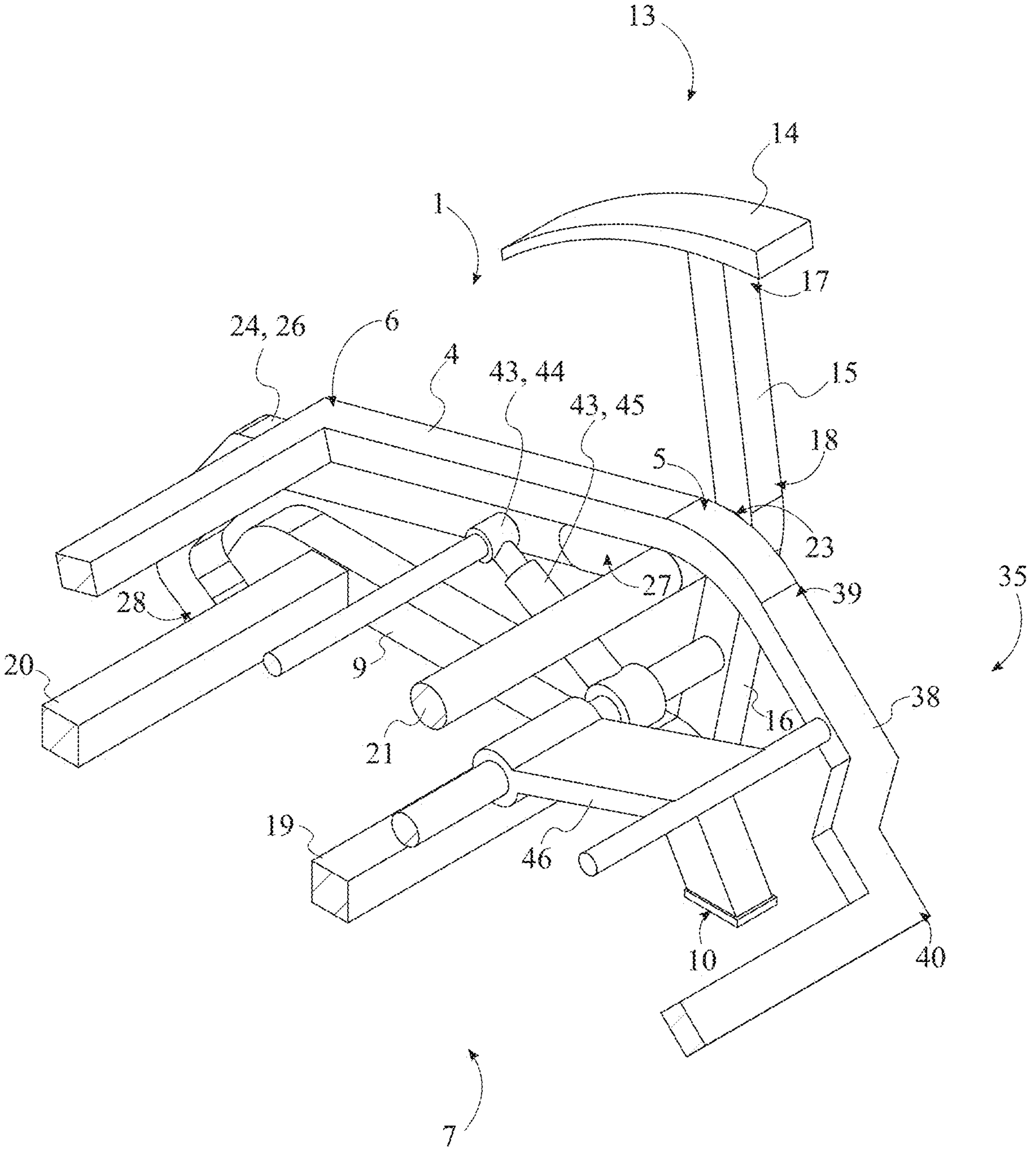
FIG. 15 is an enlarged vertical cross-sectional perspective view of the present invention taken along line 15-15 in FIG. 13.

In some embodiments, the present invention can include additional means to help the user get up that do not utilize motors or a power source. For example, the present invention may further comprise at least one gas strut 43 that helps push the seat platform 1 upward to help the user get up. The seat platform 1 can be operatively connected to the base assembly 7 by the at least one gas strut 43, wherein the at least one gas strut 43 is used to provide lift assistance to the seat platform 1. As can be seen in FIG. 13 through 15, the at least one gas strut 43 is preferably a pneumatic gas strut that comprises a piston rod 44 and a strut cylinder 45. The at least one gas strut 43 can be implemented in different configurations in such a way that the at least one gas strut 43 pushes the seat platform 1 upwards when the user gets up from the seat body 2.

Figure 10:
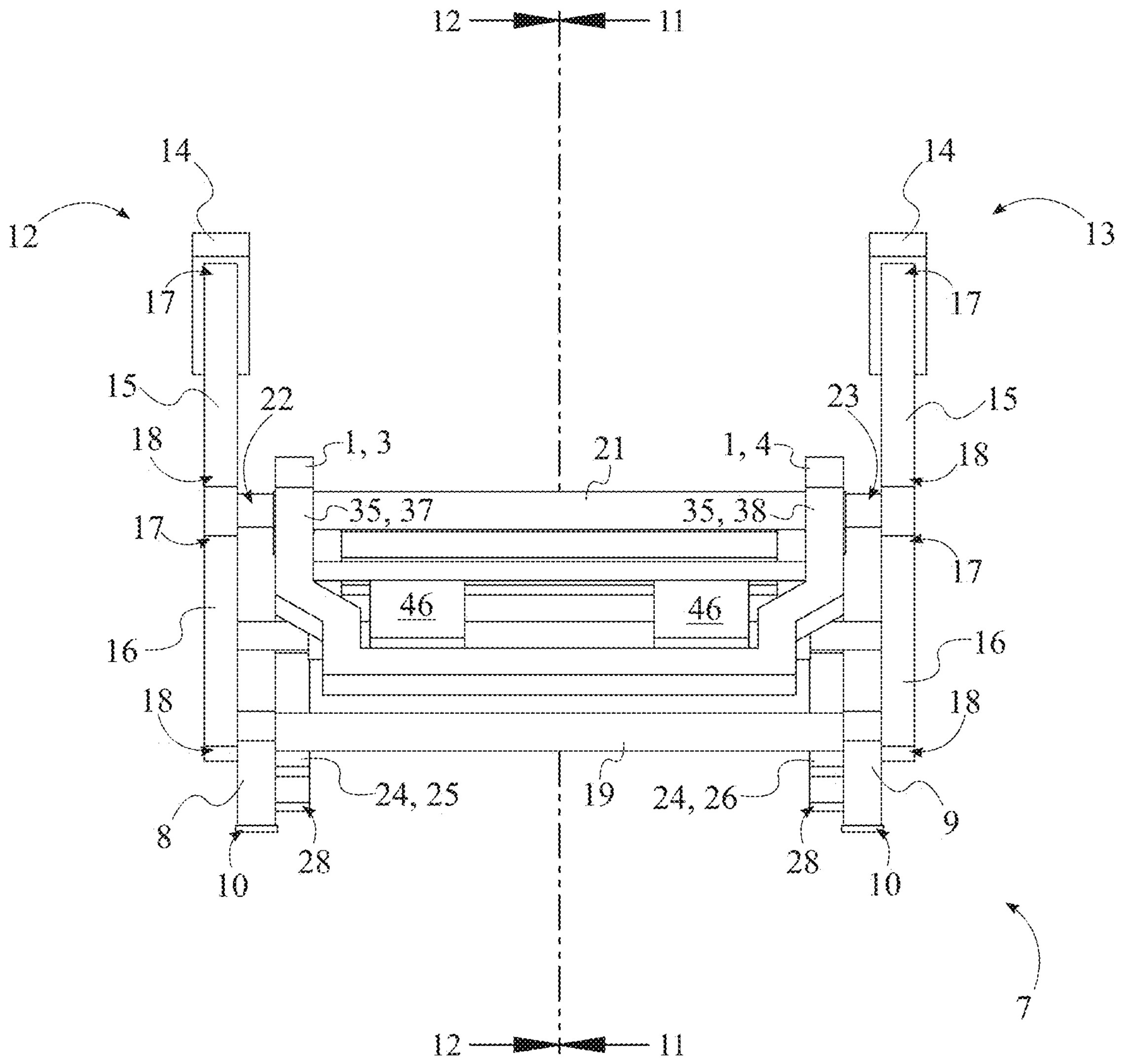
FIG. 10 is a front-side view of a first embodiment of a base assembly of the present invention, wherein the present invention is shown without a seat body, a leg body, nor a chair back.
Figure 11:
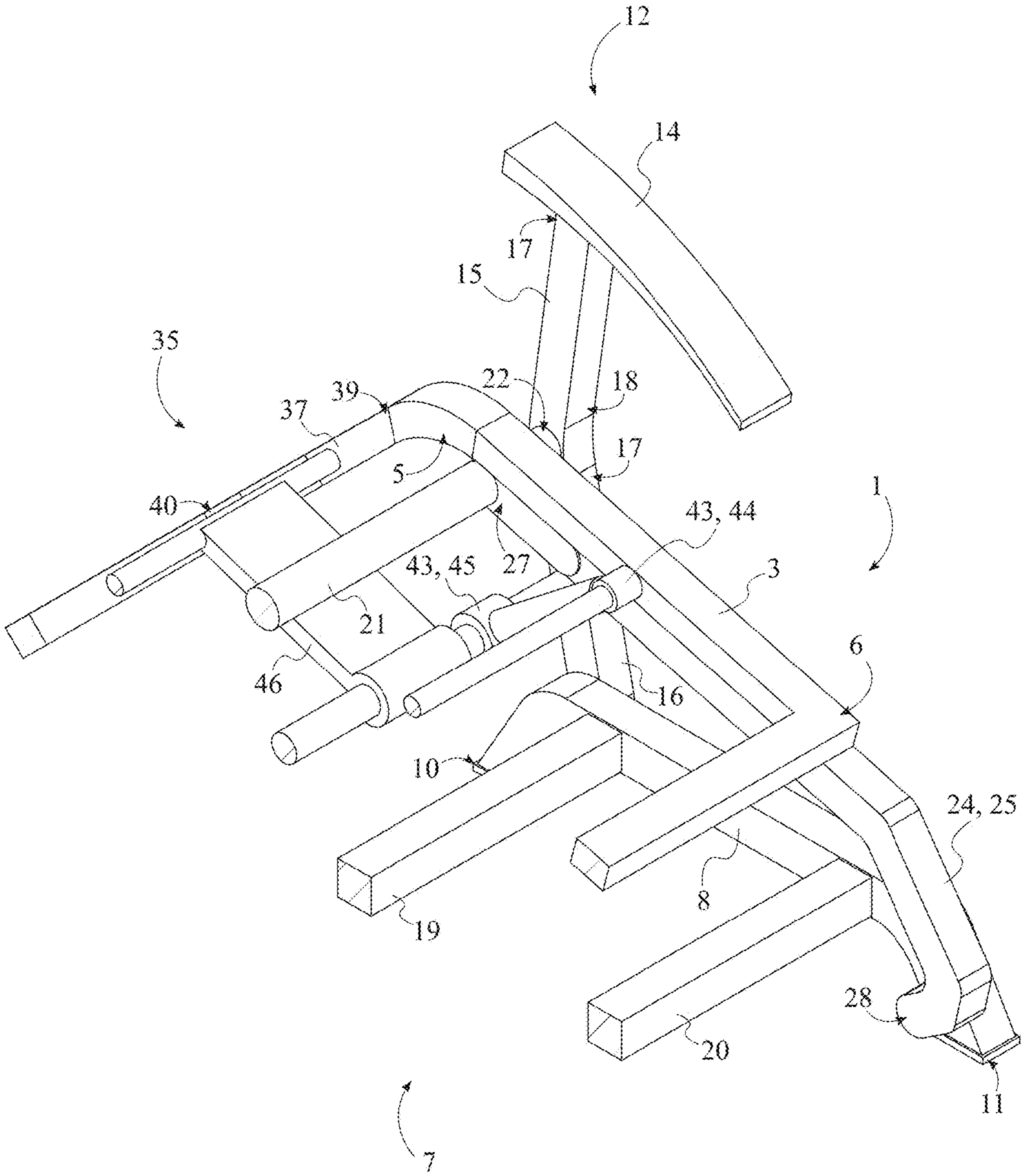
FIG. 11 is an enlarged vertical cross-sectional perspective view of the present invention taken along line 11-11 in FIG. 10.
Figure 12:
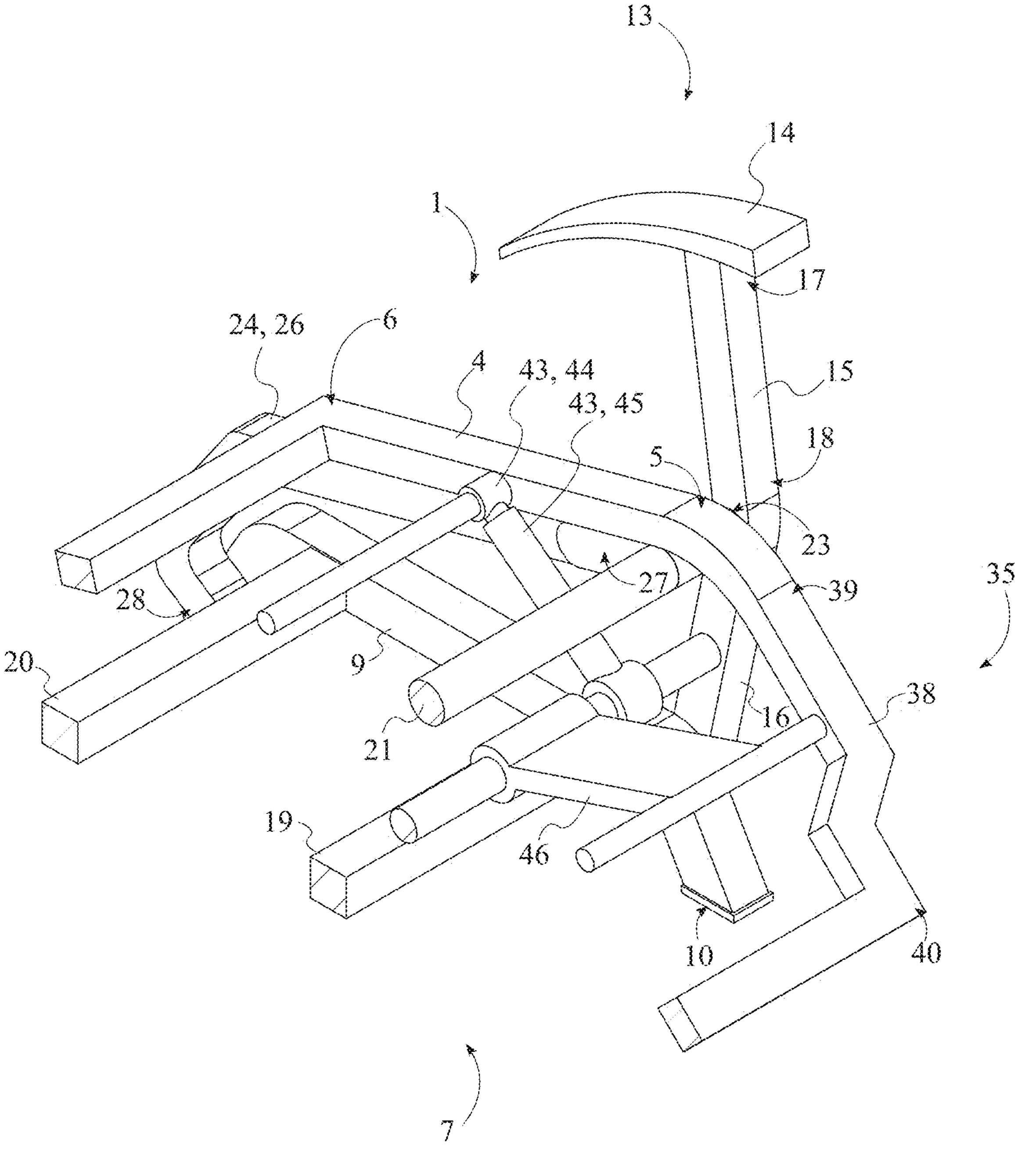
FIG. 12 is an enlarged vertical cross-sectional perspective view of the present invention taken along line 12-12 in FIG. 10.

As can be seen in FIG. 10 through 12, in one embodiment, the piston rod 44 is terminally and pivotally connected to the seat platform 1, opposite to the strut cylinder 45, to secure the piston rod 44 to the seat platform 1. The pivot connection allows the piston rod 44 to pivot on the underside of the seat body 2 to not obstruct the movement of the seat platform 1. For example, the piston rod 44 can be connected to the seat body 2, the right seat bar 3, and/or the left seat bar 4. Furthermore, the strut cylinder 45 is terminally and pivotally connected to second arm bar 16 of the right armrest 12 and the second arm bar 16 of the left armrest 13, opposite to the piston rod 44, to secure the strut cylinder 45 to the second arm bar 16 of the right armrest 12 and the second arm bar 16 of the left armrest 13. If two gas struts are utilized for greater support and balance, each strut cylinder 45 can be connected to a corresponding second arm bar 16. This way, when the user gets up, the two gas struts expand to push the seat platform 1 upward, which helps the user to get up with less effort.

Figure 16:
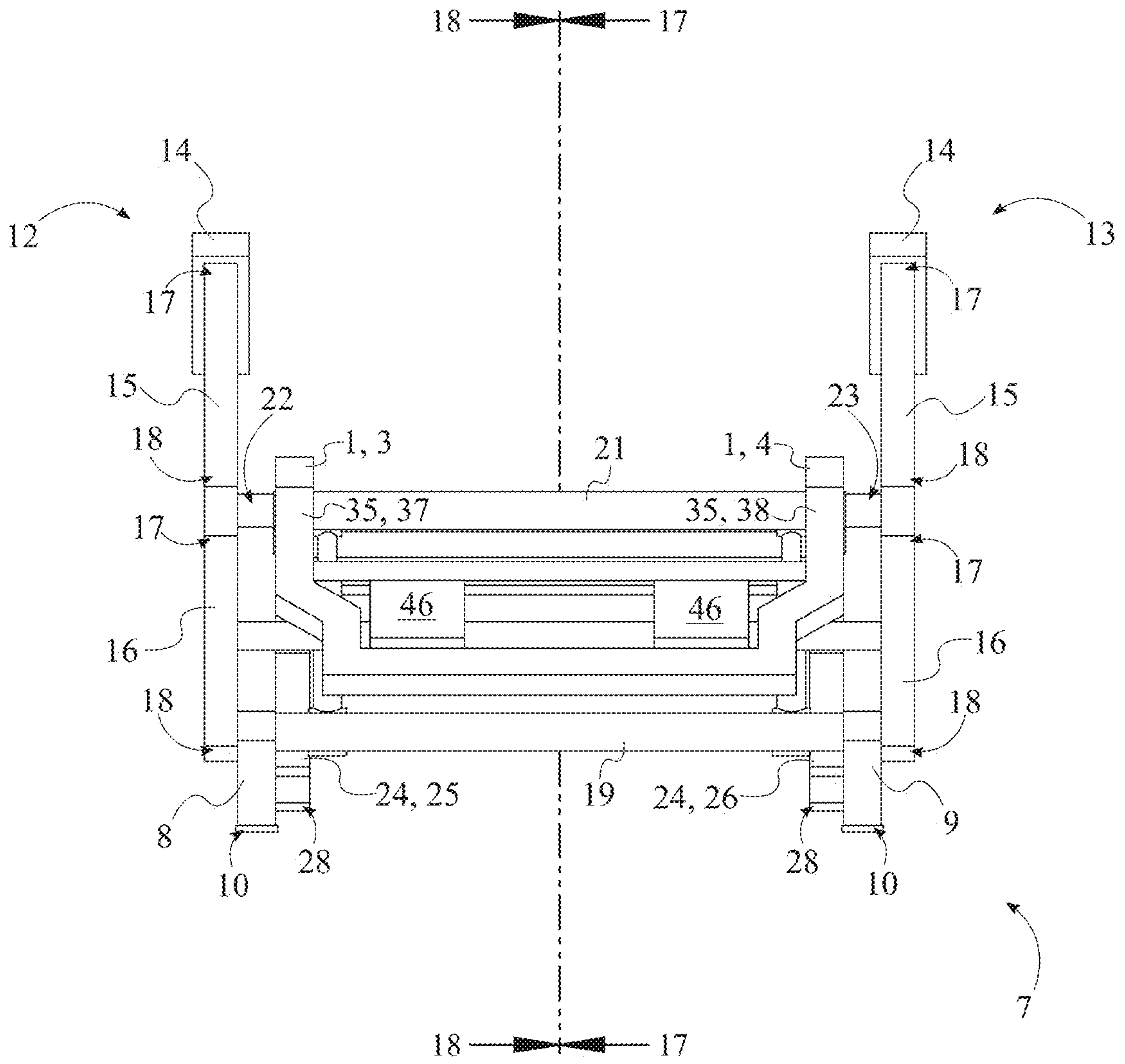
FIG. 16 is a front-side view of a third embodiment of the base assembly of the present invention, wherein present invention is shown without a seat body, a leg body, nor a chair back.
Figure 17:
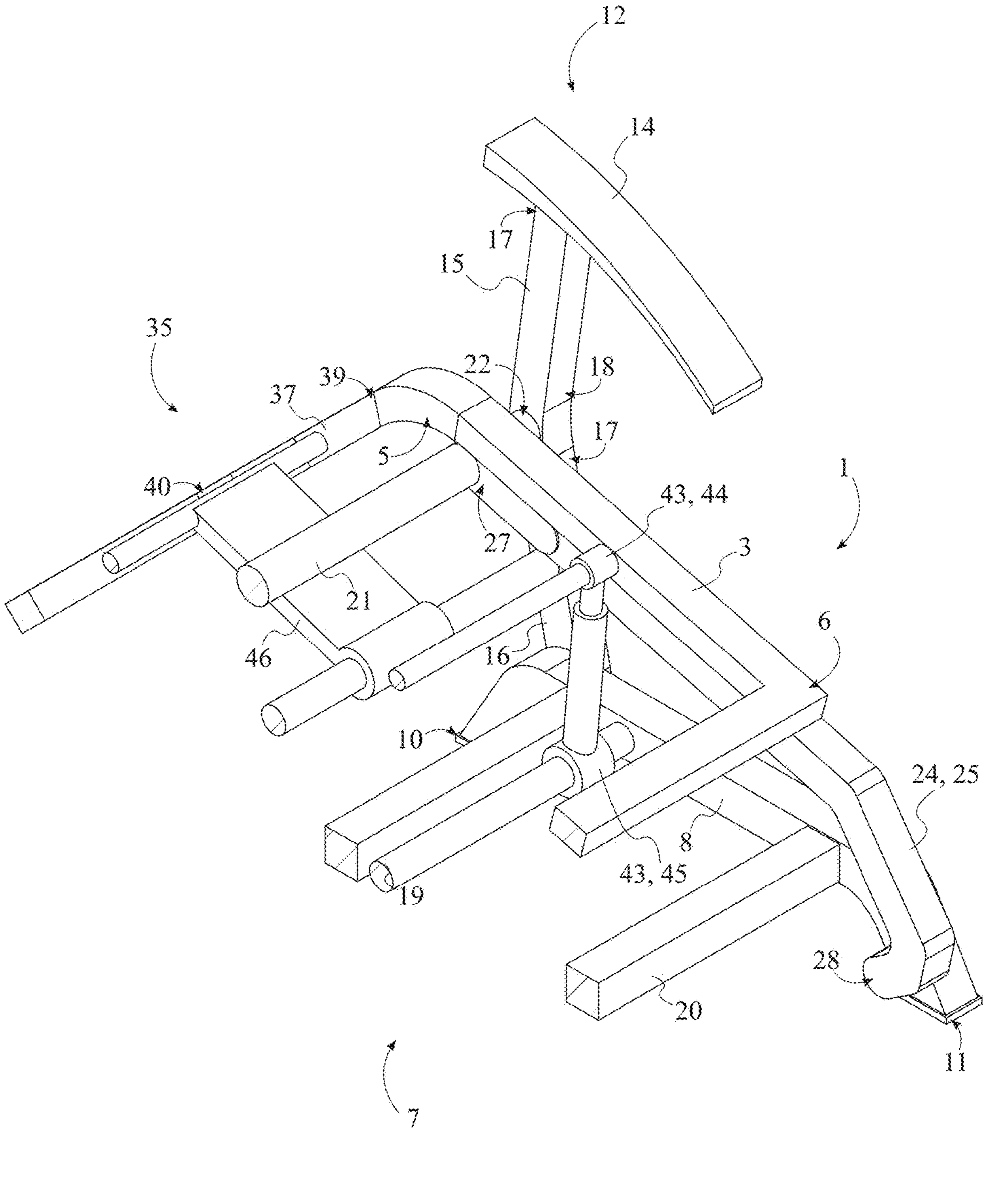
FIG. 17 is an enlarged vertical cross-sectional perspective view of the present invention taken along line 17-17 in FIG. 16.
Figure 18:
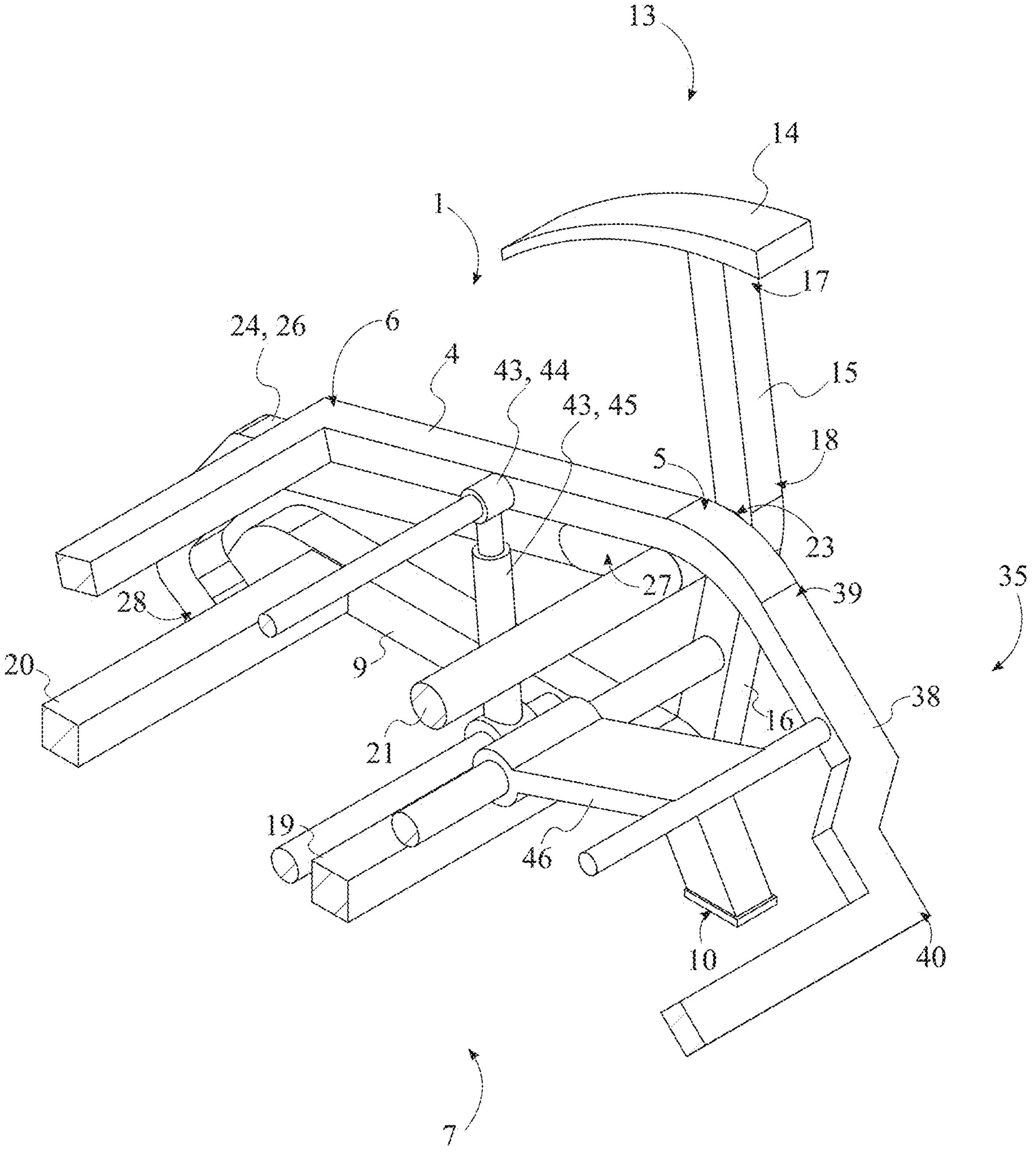
FIG. 18 is an enlarged vertical cross-sectional perspective view of the present invention taken along line 18-18 in FIG. 16.

As can be seen in FIG. 16 through 18, in another embodiment, the piston rod 44 is also terminally and pivotally connected to the seat platform 1, opposite to the strut cylinder 45, to secure the piston rod 44 to the seat platform 1. However, the strut cylinder can be terminally and pivotally connected to the right base support 8 and the left base support 9, opposite to the piston rod 44, to secure the strut cylinder 45 to the right base support 8 and the left base support 9. Likewise, if two gas struts are utilized for greater support and balance, a strut cylinder 45 can be connected to the right base support 8 while the other strut cylinder 45 can be connected to the left base support 9. This way, when the user gets up, the two gas struts can also expand to push the seat platform 1 upward, which helps the user to get up with less effort.

As can be seen in FIG. 13 through 15, in another embodiment, the at least one gas strut 43 can be connected to at least one support bar 24 to push on the seat platform 1 indirectly through the at least one support bar 24. For example, the piston rod 44 can be terminally and pivotally connected to the at least one support bar 24, opposite to the strut cylinder 45. The strut cylinder 45 can be terminally and pivotally connected to the second arm bar 16 of the right armrest 12 and the second arm bar 16 of the left armrest 13, opposite to the piston rod 44. This way, when the at least one gas strut 43 expands, the piston rod 44 pushes on the at least one support bar 24 to indirectly help move the seat platform 1 upward. In other embodiments, the at least one gas strut 43 can be arranged differently to provide support to the seat platform 1 in different ways.

Similar to the at least one gas strut 43, different support devices can be implemented to help the user get up from the seat platform 1. As can be seen in FIG. 1 through 12, the present invention may further comprise at least one tensioning device 46 that helps pivot the seat platform 1 upward to help the user get up. The seat platform 1 can be operatively connected to the base assembly 7 by the at least one tensioning device 46, wherein the at least one tensioning device 46 is used to also provide lift assistance to the seat platform 1. For example, the at least one tensioning device 46 can be an elastic band or a tension spring arranged to pull on the leg support 35 and/or the seat platform 1 to pivot the seat platform 1 upward when the user gets up. To do so, the at least one tensioning device 46 is pivotally and terminally connected to the seat platform 1 to secure the at least one tensioning device 46 to the seat platform 1. Further, the at least one tensioning device 46 is also pivotally and terminally connected to the second arm bar 16 of the right armrest 12 and the second arm bar 16 of the left armrest 13, opposite to the seat platform 1, to secure the at least one tensioning device 46 to the second arm bar 16 of the right armrest 12 and the second arm bar 16 of the left armrest 13. If several tensioning devices are utilized, each tensioning device can be connected to each second arm bar 16 of the corresponding armrest. Further, the at least one tensioning device 46 can be connected to the leg support 35 instead of the seat platform 1. In other embodiments, the at least one tensioning device 46 can be arranged in different configurations.

Figure 22:
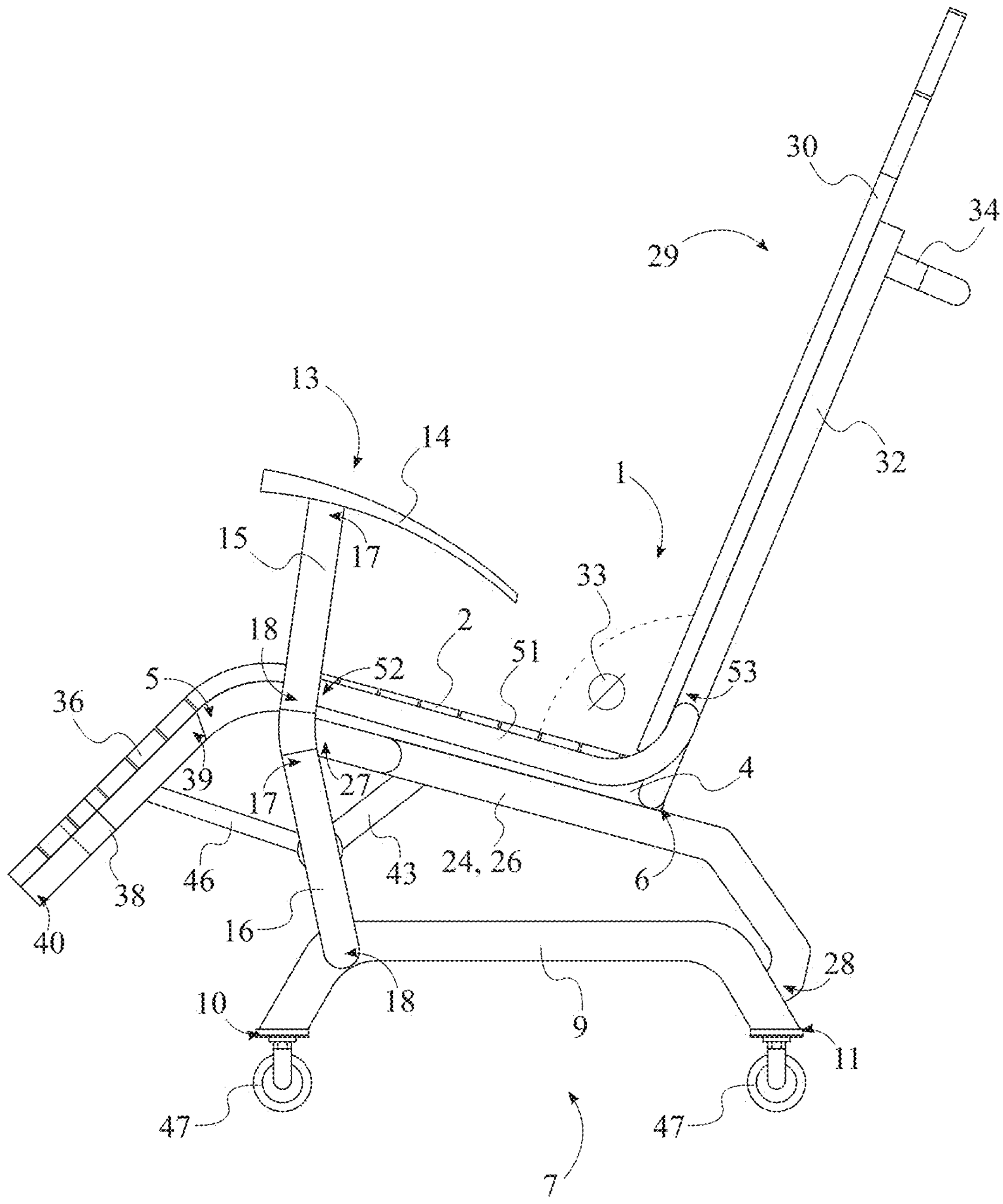
FIG. 22 is a left-side view of the present invention, wherein the base assembly of the present invention is shown equipped with lockable wheels.
Figure 23:
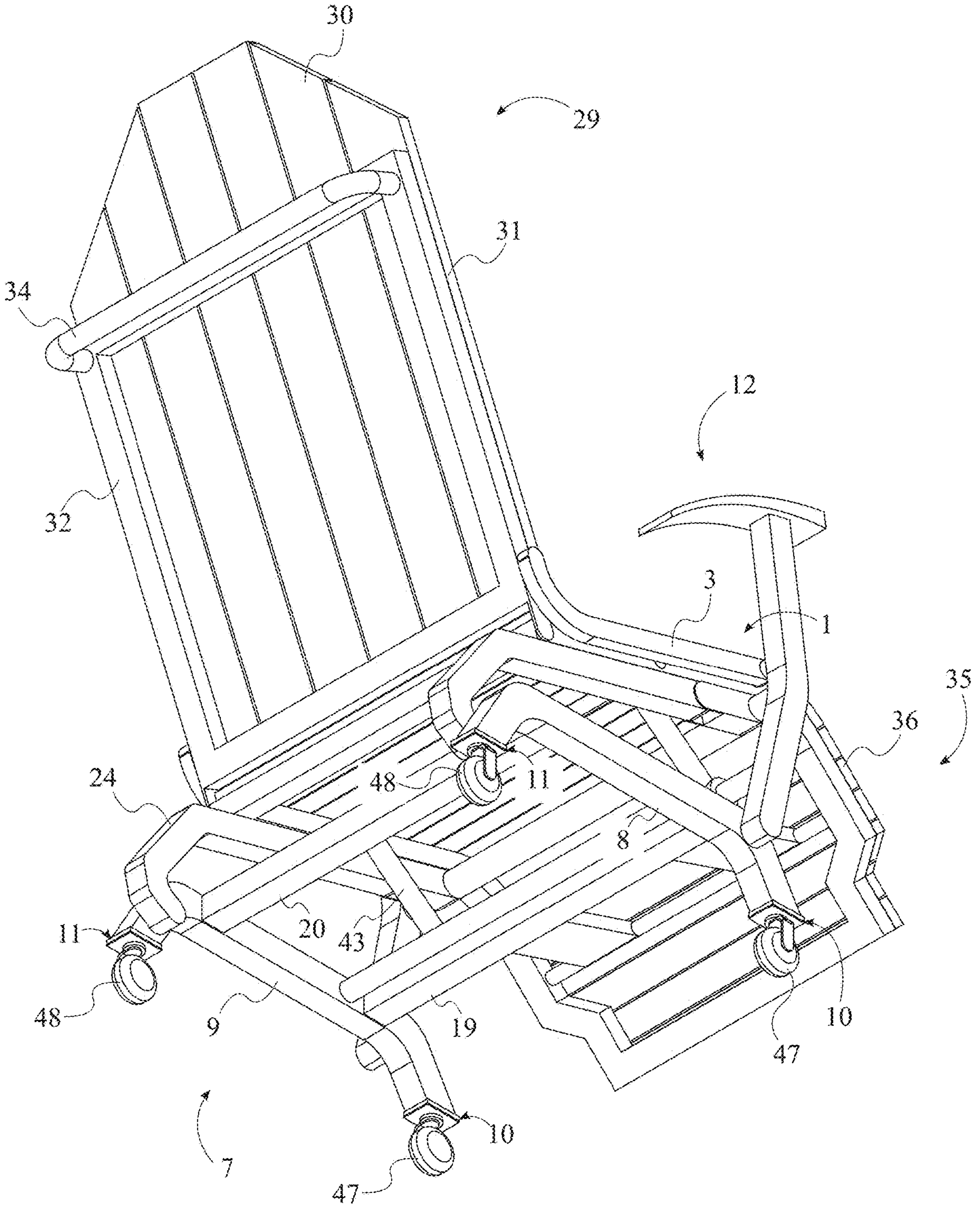
FIG. 23 is a bottom-rear-right perspective view thereof.

In some embodiments, the present invention can be equipped with means to help the user transport the present invention. As can be seen in FIGS. 22 and 23, the present invention may further comprise a pair of front lockable wheels 47 and a pair of rear lockable wheels 48 that allow the present invention to be moved along a flat surface. The pair of front lockable wheels 47 and the pair of rear lockable wheels 48 are positioned opposite to the seat platform 1 across the base assembly 7 so that the base assembly 7 is supported by the lockable wheels. Further, a wheel of the pair of front lockable wheels 47 is rotatably mounted onto the right base support 8, adjacent to the front end 10, to secure a wheel of the pair of front lockable wheels 47 to the right base support 8. Similarly, a wheel of the pair of front lockable wheels 47 is rotatably mounted onto the left base support 9, adjacent to the front end 10, to secure the other wheel of the pair of front lockable wheels 47. Likewise, a wheel of the pair of rear lockable wheels 48 is rotatably mounted onto the right base support 8, adjacent to the rear end 11, to secure a wheel of the pair of rear lockable wheels 48 to the right base support 8. Similarly, a wheel of the pair of rear lockable wheels 48 is rotatably mounted onto the left base support 9, adjacent to the rear end 11, to secure the other wheel of the pair of rear lockable wheels 48 to the left base support 9. This way, the base assembly 7 can move on a flat surface by using all lockable wheels. When the user wants to sit on the seat platform 1, the user can first lock all lockable wheels to prevent the base assembly 7 from moving while the user sits on the seat platform 1.

Figure 24:
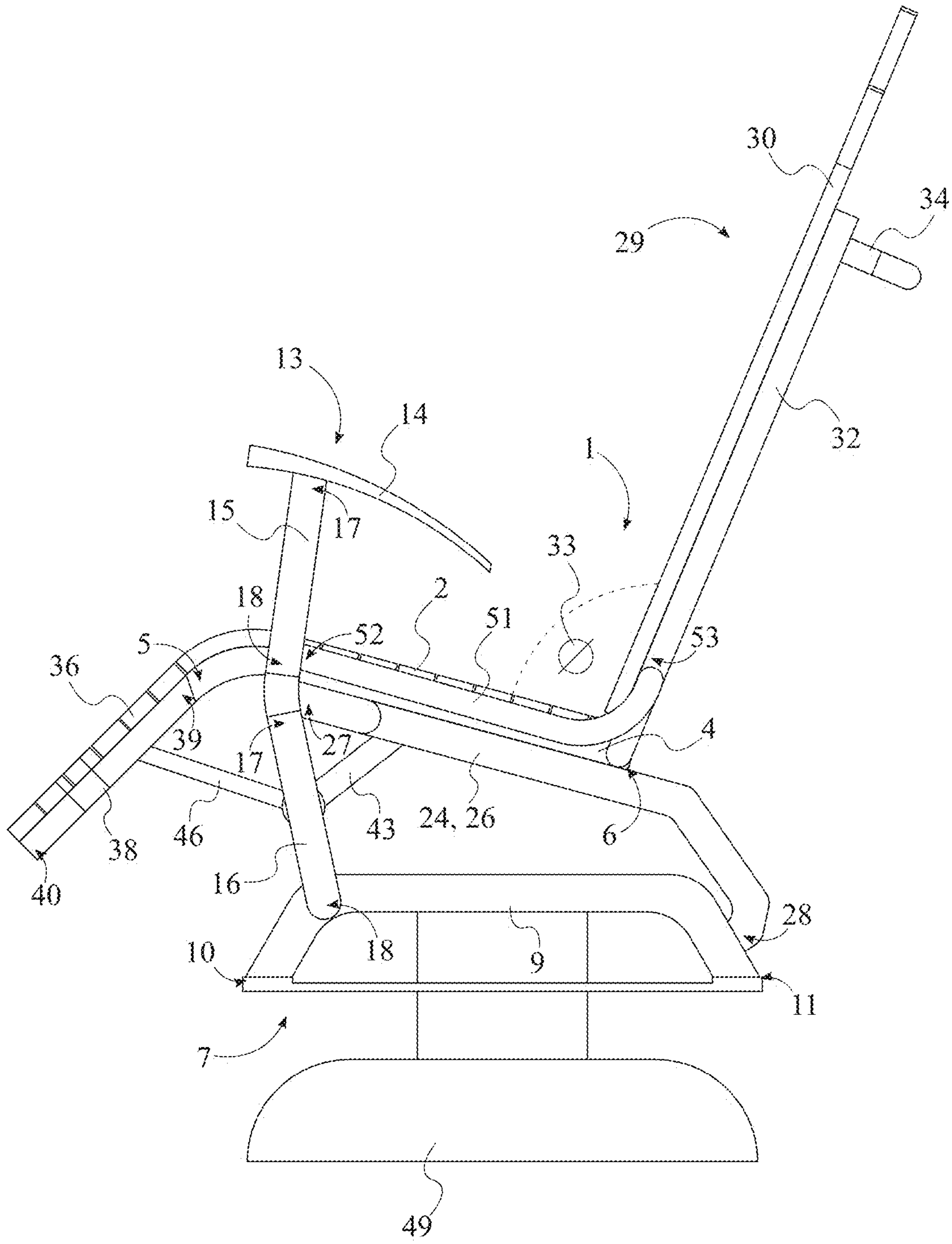
FIG. 24 is a left-side view of the present invention, wherein the base assembly of the present invention is shown mounted on a swiveling base.

In some embodiments, the present invention can provide a means for the user to reposition the orientation of the present invention while the user sits on the seat platform 1. For example, the present invention may further comprise a swiveling base 49 that allows the base assembly 7 to spin in place. As can be seen in FIG. 24, the swiveling base 49 is positioned opposite to the seat platform 1 across the base assembly 7 to enable the base assembly 7 to rest on the swiveling base 49. In addition, the base assembly 7 is rotatably mounted onto the swiveling base 49 to secure the base assembly 7 to the swiveling base 49. This way, the user can change the orientation of the present invention by spinning the base assembly 7 on the swiveling base 49 while sitting on the seat platform 1. In other embodiments, different base attachments can be provided for the base assembly 7.

Although the invention has been explained in relation to its preferred embodiment, it is to be understood that many other possible modifications and variations can be made without departing from the spirit and scope of the invention.

What is claimed is:

1. A chair with a lift mechanism comprising:
- a seat platform;
- a base assembly;
- the base assembly comprising a right base support, a left base support, a right armrest, a left armrest, a front crossbar, a rear crossbar, a pivoting rod, and at least one support bar;
- the right base support and the left base support each comprising a front end and a rear end;
- the front crossbar being connected between the right base support and the left base support, adjacent to each front end;
- the rear crossbar being connected between the right base support and the left base support, adjacent to each rear end;
- the right armrest being pivotally mounted onto the right base support, adjacent to the front end;
- the left armrest being pivotally mounted onto the left base support, adjacent to the front end;
- the pivoting rod being terminally and pivotally connected to the right armrest, offset to the right base support;
- the pivoting rod being terminally and pivotally connected to the left armrest, offset to the left base support;
- the at least one support bar being terminally and pivotally connected in between the right armrest and the left armrest, adjacent to the pivoting rod;
- the at least one support bar being terminally and pivotally connected in between the rear end of the right base support and the rear end of the left base support, adjacent to the rear crossbar; and
- the seat platform being laterally connected to the pivoting rod, opposite to the front crossbar.

2. The chair with a lift mechanism as claimed in claim 1 comprising:
- the at least one support bar being a right support bar and a left support bar;
- the pivoting rod comprising a right rod end and a left rod end;
- the right support bar and the left support bar each comprising a front support end and a rear support end;
- the front crossbar, the rear crossbar, and the pivoting rod being positioned parallel to each other;
- the right rod end and the front support end of the right support bar being pivotally connected to the right armrest;
- the left rod end and the front support end of the left support bar being pivotally connected to the left armrest;
- the rear support end of the right support bar being pivotally connected to the rear end of the right base support, adjacent to the rear crossbar;
- the rear support end of the left support bar being pivotally connected to the rear end of the left base support, adjacent to the rear crossbar.

3. The chair with a lift mechanism as claimed in claim 1 comprising:
- the seat platform comprising a seat body, a right seat bar, and a left seat bar;

the right seat bar and the left seat bar each comprising a front bar end and a rear bar end;

the right seat bar and the left seat bar being positioned parallel and offset to each other;

each front bar end being positioned adjacent to the pivoting rod;

each rear bar end being positioned offset to the pivoting rod;

the right seat bar being laterally connected to the pivoting rod, adjacent to the right armrest;

the left seat bar being laterally connected to the pivoting rod, adjacent to the left armrest;

the right seat bar being laterally attached to the seat body; and the left seat bar being laterally attached to the seat body, opposite to the right seat bar.

4. The chair with a lift mechanism as claimed in claim 3 comprising:

a chair back;

the chair back comprising a back body, a right back bar, a left back bar, right back arm, and a left back arm;

the right back arm and the left back arm each comprising a front arm end and a rear arm end;

the back body being oriented at an angle with the seat body;

the right back bar being laterally attached to the back body;

the left back bar being laterally attached to the back body, opposite to the right back bar;

the rear bar end of the right seat bar being hingedly connected to the right back bar;

the rear bar end of the left seat bar being hingedly connected to the left back bar;

the front arm end of the right back arm being pivotally connected to right armrest, adjacent to the pivoting rod;

the rear arm end of the right back arm being laterally and pivotally connected to the right back bar, offset to the rear bar end of the right seat bar;

the front arm end of the left back arm being pivotally connected to left armrest, adjacent to the pivoting rod; and the rear arm end of the left back arm being laterally and pivotally connected to the left back bar, offset to the rear bar end of the left seat bar.

5. The chair with a lift mechanism as claimed in claim 4 comprising:

at least one back handle; and the at least one back handle being laterally connected to the back body, opposite to the seat platform.

6. The chair with a lift mechanism as claimed in claim 3 comprising:

a chair back;

the chair back comprising a back body, a right back bar, and a left back bar;

the chair back being oriented at an angle with the seat platform;

the right back bar being laterally attached to the back body;

the left back bar being laterally attached to the back body, opposite to the right back bar;

the rear bar end of the right seat bar being laterally connected to the right back bar; and the rear bar end of the left seat bar being laterally connected to the left back bar.

7. The chair with a lift mechanism as claimed in claim 6 comprising:

at least one back handle; and the at least one back handle being laterally connected to the back body, opposite to the seat platform.

8. The chair with a lift mechanism as claimed in claim 3 comprising:

the seat platform further comprising a leg support;

the leg support comprising a leg body, a right leg bar, and a left leg bar;

the right leg bar and the left leg bar each comprising a proximal bar end and a distal bar end;

the right leg bar and the left leg bar being positioned parallel and offset to each other;

the right leg bar being positioned at an angle with the right seat bar;

the left leg bar being positioned at an angle with the left seat bar;

the proximal bar end of the right leg bar being connected to the front bar end of the right seat bar;

the proximal bar end of the left leg bar being connected to the front bar end of the left seat bar; and the leg body being mounted onto the right leg bar and the left leg bar, opposite to the base assembly.

9. The chair with a lift mechanism as claimed in claim 8 comprising:

the seat platform further comprising a foldable step;

the foldable step comprising a fixed step edge; and the fixed step edge being hingedly connected between the distal bar end of the right leg bar and the distal bar end of the left leg bar.

10. The chair with a lift mechanism as claimed in claim 1 comprising:

the right armrest and the left armrest each comprising an armrest handle, a first arm bar, and a second arm bar;

the first arm bar and the second arm bar each comprising a first bar end and a second bar end;

the armrest handle of the right armrest and the armrest handle of the left armrest being positioned parallel to each other;

the first bar end of each first arm bar being terminally connected to the corresponding armrest handle;

the second bar end of each first arm bar being terminally connected to the first bar end of the corresponding second arm bar;

the pivoting rod being terminally and pivotally connected to the first bar end of the second arm bar of the right armrest;

the pivoting rod being terminally and pivotally connected to the first bar end of the second arm bar of the left armrest;

the second bar end of the second arm bar of the right armrest being pivotally connected to the right base support; and the second bar end of the second arm bar of the left armrest being pivotally connected to the left base support.

11. The chair with a lift mechanism as claimed in claim 10 comprising:

at least one gas strut; and the seat platform being operatively connected to the base assembly by the at least one gas strut, wherein the at least one gas strut is used to provide lift assistance to the seat platform.

12. The chair with a lift mechanism as claimed in claim 11 comprising:

the at least one gas strut comprising a piston rod and a strut cylinder;

the piston rod being terminally and pivotally connected to the seat platform, opposite to the strut cylinder; and the strut cylinder being terminally and pivotally connected to the second arm bar of the right armrest and the second arm bar of the left armrest, opposite to the piston rod.

13. The chair with a lift mechanism as claimed in claim 11 comprising:

the at least one gas strut comprising a piston rod and a strut cylinder;

the piston rod being terminally and pivotally connected to the seat platform, opposite to the strut cylinder; and the strut cylinder being terminally and pivotally connected to the right base support and the left base support, opposite to the piston rod.

14. The chair with a lift mechanism as claimed in claim 10 comprising:

at least one gas strut;

the at least one gas strut comprising a piston rod and a strut cylinder;

the piston rod being terminally and pivotally connected to the at least one support bar, opposite to the strut cylinder; and the strut cylinder being terminally and pivotally connected to the second arm bar of the right armrest and the second arm bar of the left armrest, opposite to the piston rod.

15. The chair with a lift mechanism as claimed in claim 10 comprising:

at least one tensioning device; and the seat platform being operatively connected to the base assembly by the at least one tensioning device, wherein the at least one tensioning device is used to provide lift assistance to the seat platform.

16. The chair with a lift mechanism as claimed in claim 15 comprising:

the at least one tensioning device being pivotally and terminally connected to the seat platform; and the at least one tensioning device being pivotally and terminally connected to the second arm bar of the right armrest and the second arm bar of the left armrest, opposite to the seat platform.

17. The chair with a lift mechanism as claimed in claim 1 comprising:

a pair of front lockable wheels;

a pair of rear lockable wheels;

the pair of front lockable wheels and the pair of rear lockable wheels being positioned opposite to the seat platform across the base assembly;

a wheel of the pair of front lockable wheels being rotatably mounted onto the right base support, adjacent to the front end;

a wheel of the pair of front lockable wheels being rotatably mounted onto the left base support, adjacent to the front end;

a wheel of the pair of rear lockable wheels being rotatably mounted onto the right base support, adjacent to the rear end; and a wheel of the pair of rear lockable wheels being rotatably mounted onto the left base support, adjacent to the rear end.

18. The chair with a lift mechanism as claimed in claim 1 comprising:

a swiveling base;

the swiveling base being positioned opposite to the seat platform across the base assembly; and the base assembly being rotatably mounted onto the swiveling base.

19. The chair with a lift mechanism as claimed in claim 1 comprising:

a chair back;

the chair back being oriented at an angle with the right armrest and the left armrest;

the chair back being positioned offset to the front crossbar;

the chair back being laterally connected to the right armrest; and the chair back being laterally connected to the left armrest, opposite to the right armrest.

* * * * *